United States Patent [19]
Ohran

[11] Patent Number: 5,835,953
[45] Date of Patent: Nov. 10, 1998

[54] BACKUP SYSTEM THAT TAKES A SNAPSHOT OF THE LOCATIONS IN A MASS STORAGE DEVICE THAT HAS BEEN IDENTIFIED FOR UPDATING PRIOR TO UPDATING

[75] Inventor: Richard Ohran, Provo, Utah

[73] Assignee: Vinca Corporation, Orem, Utah

[21] Appl. No.: 747,151

[22] Filed: Nov. 8, 1996

Related U.S. Application Data

[63] Continuation-in-part of Ser. No. 322,697, Oct. 13, 1994, Pat. No. 5,649,152.

[51] Int. Cl.⁶ .................................................. G06F 12/16
[52] U.S. Cl. ........................................... 711/162; 711/162
[58] Field of Search .................................... 711/161, 162, 711/165

[56] References Cited

U.S. PATENT DOCUMENTS

| | | | |
|---|---|---|---|
| 3,054,560 | 9/1962 | Hartley | 235/151 |
| 3,303,474 | 2/1967 | Moore et al. | 340/172.5 |
| 3,444,528 | 5/1969 | Lovel et al. | 340/172.5 |
| 3,533,082 | 10/1970 | Schnabel et al. | 340/172.5 |
| 3,544,477 | 12/1970 | Heller | 252/301.1 |
| 3,557,315 | 1/1971 | Kobus et al. | 179/15 |
| 3,602,900 | 8/1971 | Delaigue et al. | 340/172.5 |
| 3,623,014 | 11/1971 | Doetz | 340/172.5 |
| 3,636,331 | 1/1972 | Amrehn | 235/151.12 |
| 3,665,173 | 5/1972 | Bouricius et al. | 235/153 |
| 3,681,578 | 8/1972 | Stevens | 235/153 |
| 3,725,861 | 4/1973 | Hancock | 340/146.1 |
| 3,735,356 | 5/1973 | Yates | 340/172.5 |
| 3,754,211 | 8/1973 | Rocher et al. | 340/146.1 |
| 3,760,364 | 9/1973 | Yamauchi et al. | 340/172.5 |
| 3,761,884 | 9/1973 | Avsan et al. | 340/172.5 |
| 3,771,137 | 11/1973 | Barner et al. | 340/172.5 |
| 3,803,568 | 4/1974 | Higashide | 340/213 R |
| 3,810,119 | 5/1974 | Zieve et al. | 340/172.5 |

(List continued on next page.)

OTHER PUBLICATIONS

Lyon, J. "Tandem's Remote Data Facility," *IEEE,* Spring 1990.
Moline, H., et al., "Issues in Disater Recovery," *IEEE,* Spring 1990.
"White Paper—Compaq On–Line Recovery Server, Executive Summary," *Compaq,* Sep. 1995.
Steinberg, J. A., "Diverting data from disaster," *Digital Review,* vol. 8, No. 35, p. 47(3).
Dinman, S. B., "Micro backup devices: protecting your data form equipment failure," *Government Computer News,* vol. 7, No. 19, p. 85(5).
Gershen, "RAID and Reliability," *RS Magazine,* Sep. 1992.
Bolles, "A RAID Stack: Micropolis' RAIDION," *Network Computing,* Jun. 1992.
Sullivan, "NCR Disk Array Software Supports Multilevel RAID".
Busse, "High–end Sanyo Disk System Offers Multiple RAID Levels," *News/Networking,* Sep. 28, 1992.

(List continued on next page.)

*Primary Examiner*—Tod R. Swann
*Assistant Examiner*—Felix B. Lee
*Attorney, Agent, or Firm*—Workman Nydegger Seeley

[57] ABSTRACT

A system and method for maintaining logically consistent backups using minimal data transfer are presented. A system comprises a backup system having a backup storage device and one or more primary systems having mass storage devices that are to be backed up on the backup storage device. The primary systems identify changes that are going to be made to the mass storage device. The combined effected locations in the mass storage device of these identified changes are then captured in a static snapshot when the mass storage device is in a logically consistent state. Only those data blocks changed since the last backup are then transferred to backup system. The backup system can then store these changes or apply the changes to the backup storage device in order to bring the backup storage device current to a particular point in time.

21 Claims, 11 Drawing Sheets

U.S. PATENT DOCUMENTS

| | | | |
|---|---|---|---|
| 3,810,121 | 5/1974 | Chang et al. | 340/172.5 |
| 3,812,469 | 5/1974 | Hauck et al. | 340/172.5 |
| 3,820,085 | 6/1974 | Zelinski | 340/172.5 |
| 3,824,547 | 7/1974 | Green et al. | 340/146.1 |
| 3,828,321 | 8/1974 | Wilber et al. | 340/172.5 |
| 3,864,670 | 2/1975 | Inoue et al. | 340/172.5 |
| 3,865,999 | 2/1975 | Spitaels | 179/175.2 R |
| 3,889,237 | 6/1975 | Alferness et al. | 340/172.5 |
| 3,959,638 | 5/1976 | Blum et al. | 235/153 |
| 3,991,407 | 11/1976 | Jordan, Jr. et al. | 340/172.5 |
| 4,012,717 | 3/1977 | Censier et al. | 340/172.5 |
| 4,051,461 | 9/1977 | Hashimoto et al. | 364/900 |
| 4,073,005 | 2/1978 | Parkin | 364/200 |
| 4,076,961 | 2/1978 | Holsinger et al. | 179/2 DP |
| 4,099,241 | 7/1978 | Ossfeldt | 364/200 |
| 4,118,772 | 10/1978 | Takada | 364/119 |
| 4,141,066 | 2/1979 | Keiles | 364/119 |
| 4,152,764 | 5/1979 | Connors et al. | 364/200 |
| 4,156,901 | 5/1979 | Haraden et al. | 362/296 |
| 4,159,517 | 6/1979 | Paradine et al. | 364/200 |
| 4,164,017 | 8/1979 | Randell et al. | 364/200 |
| 4,191,996 | 3/1980 | Chesley | 364/200 |
| 4,208,715 | 6/1980 | Kumahara et al. | 364/200 |
| 4,228,503 | 10/1980 | Waite et al. | 364/200 |
| 4,257,009 | 3/1981 | Yorkanis | 330/51 |
| 4,270,167 | 5/1981 | Koehler et al. | 364/200 |
| 4,282,572 | 8/1981 | Moore, III et al. | 364/200 |
| 4,318,173 | 3/1982 | Freedman et al. | 364/200 |
| 4,332,027 | 5/1982 | Malcolm et al. | 370/94 |
| 4,351,023 | 9/1982 | Richer | 364/187 |
| 4,358,823 | 11/1982 | McDonald et al. | 364/200 |
| 4,359,718 | 11/1982 | Payen | 340/825.03 |
| 4,371,754 | 2/1983 | De et al. | 179/18 |
| 4,378,588 | 3/1983 | Kutzman et al. | 364/200 |
| 4,380,047 | 4/1983 | Eisenhard et al. | 364/200 |
| 4,380,067 | 4/1983 | Beardsley et al. | 371/11 |
| 4,402,046 | 8/1983 | Cox et al. | 364/200 |
| 4,403,286 | 9/1983 | Fre et al. | 364/200 |
| 4,403,303 | 9/1983 | Howes et al. | 364/900 |
| 4,423,414 | 12/1983 | Bryant et al. | 340/825.07 |
| 4,428,044 | 1/1984 | Liron | 364/200 |
| 4,430,699 | 2/1984 | Segarra et al. | 364/200 |
| 4,434,487 | 2/1984 | Rubinson et al. | 371/10 |
| 4,439,859 | 3/1984 | Donnan | 371/32 |
| 4,445,214 | 4/1984 | Reynolds et al. | 370/94 |
| 4,453,215 | 6/1984 | Reid | 364/200 |
| 4,455,601 | 6/1984 | Griscom et al. | 364/200 |
| 4,455,645 | 6/1984 | Mijioka et al. | 370/16 |
| 4,459,658 | 7/1984 | Gabbe et al. | 364/200 |
| 4,471,429 | 9/1984 | Porter et al. | 364/200 |
| 4,477,882 | 10/1984 | Schumacher et al. | 364/900 |
| 4,477,895 | 10/1984 | Casper et al. | 370/16 |
| 4,479,214 | 10/1984 | Ryan | 371/11 |
| 4,480,304 | 10/1984 | Carr et al. | 364/200 |
| 4,483,001 | 11/1984 | Ryan | 371/11 |
| 4,484,275 | 11/1984 | Katzman et al. | 364/200 |
| 4,486,826 | 12/1984 | Wolff et al. | 364/200 |
| 4,498,145 | 2/1985 | Baker et al. | 364/900 |
| 4,507,751 | 3/1985 | Gawlick et al. | 364/900 |
| 4,516,121 | 5/1985 | Moriyama et al. | 340/825.05 |
| 4,521,847 | 6/1985 | Ziehm et al. | 364/184 |
| 4,530,051 | 7/1985 | Johnson et al. | 364/200 |
| 4,530,052 | 7/1985 | King et al. | 364/200 |
| 4,562,535 | 12/1985 | Vincent et al. | 364/200 |
| 4,581,701 | 4/1986 | Hess et al. | 364/187 |
| 4,583,089 | 4/1986 | Cope | 340/825.05 |
| 4,589,090 | 5/1986 | Downing et al. | 364/900 |
| 4,590,554 | 5/1986 | Glazer et al. | 364/200 |
| 4,604,690 | 8/1986 | Crabtree et al. | 364/200 |
| 4,607,365 | 8/1986 | Greig et al. | 371/8 |
| 4,608,688 | 8/1986 | Hansen et al. | 371/11 |
| 4,610,013 | 9/1986 | Long et al. | 371/9 |
| 4,615,001 | 9/1986 | Hudgins, Jr. | 364/200 |
| 4,623,883 | 11/1986 | Konen | 340/825.01 |
| 4,628,508 | 12/1986 | Sager et al. | 371/9 |
| 4,630,224 | 12/1986 | Sollman | 364/550 |
| 4,639,852 | 1/1987 | Motomiya | 364/138 |
| 4,639,856 | 1/1987 | Hrustich et al. | 364/200 |
| 4,644,470 | 2/1987 | Feigenbaum et al. | 364/200 |
| 4,646,300 | 2/1987 | Goodman et al. | 371/33 |
| 4,648,031 | 3/1987 | Jenner | 364/200 |
| 4,648,061 | 3/1987 | Foster | 264/900 |
| 4,652,940 | 3/1987 | Symiyoshi | 360/5 |
| 4,654,819 | 3/1987 | Stiffler et al. | 364/900 |
| 4,654,846 | 3/1987 | Goodwin et al. | 371/8 |
| 4,654,857 | 3/1987 | Samson et al. | 371/68 |
| 4,656,596 | 4/1987 | Thaden et al. | 364/521 |
| 4,674,038 | 6/1987 | Brelsford et al. | 364/200 |
| 4,680,581 | 7/1987 | Kozlik et al. | 340/825.06 |
| 4,691,314 | 9/1987 | Bergins et al. | 370/94 |
| 4,703,421 | 10/1987 | Abrant et al. | 364/200 |
| 4,703,481 | 10/1987 | Fremont | 371/12 |
| 4,713,811 | 12/1987 | Frey | 371/9 |
| 4,727,516 | 2/1988 | Yoshida et al. | 365/200 |
| 4,727,544 | 2/1988 | Brunner et al. | 371/21 |
| 4,736,339 | 4/1988 | Crabbe, Jr. | 364/900 |
| 4,740,969 | 4/1988 | Fremont | 371/12 |
| 4,750,177 | 6/1988 | Hendrie et al. | 371/32 |
| 4,754,397 | 6/1988 | Varaiya et al. | 364/200 |
| 4,782,486 | 11/1988 | Lipcon et al. | 371/21 |
| 4,800,488 | 1/1989 | Agrawal et al. | 364/200 |
| 4,823,256 | 4/1989 | Bishop et al. | 364/200 |
| 4,866,707 | 9/1989 | Marshall et al. | 370/94.1 |
| 4,878,167 | 10/1989 | Kapulka et al. | 354/200 |
| 4,941,087 | 7/1990 | Kap | 364/200 |
| 4,953,122 | 8/1990 | William | 364/900 |
| 4,959,768 | 9/1990 | Gerhart | 364/187 |
| 4,959,774 | 9/1990 | Davis | 364/200 |
| 4,979,108 | 12/1990 | Crabbe, Jr. | 364/200 |
| 5,005,122 | 4/1991 | Griffin et al. | 364/200 |
| 5,038,278 | 8/1991 | Steely, Jr. et al. | 395/200 |
| 5,048,022 | 9/1991 | Bissett et al. | 371/40.1 |
| 5,060,185 | 10/1991 | Naito et al. | 364/900 |
| 5,068,851 | 11/1991 | Bruckert et al. | 371/16.1 |
| 5,079,740 | 1/1992 | Patel et al. | 364/900 |
| 5,086,502 | 2/1992 | Malcolm | 395/575 |
| 5,088,081 | 2/1992 | Farr | 369/54 |
| 5,089,958 | 2/1992 | Horton et al. | 395/575 |
| 5,123,099 | 6/1992 | Shibata et al. | 395/425 |
| 5,157,663 | 10/1992 | Major et al. | 371/9.1 |
| 5,163,148 | 11/1992 | Walls | 707/204 |
| 5,177,744 | 1/1993 | Cesare et al. | 371/10.1 |
| 5,235,700 | 8/1993 | Alaiwan et al. | 395/575 |
| 5,241,670 | 8/1993 | Eastridge et al. | 395/180 |
| 5,276,867 | 1/1994 | Kenley et al. | 395/600 |
| 5,291,494 | 3/1994 | Bruckert et al. | 371/11.3 |
| 5,295,258 | 3/1994 | Jewett et al. | 395/575 |
| 5,307,481 | 4/1994 | Shimazaki et al. | 395/575 |
| 5,343,477 | 8/1994 | Yamada | 371/8.2 |
| 5,403,639 | 4/1995 | Belsan et al. | 395/600 |
| 5,410,667 | 4/1995 | Belsan et al. | 395/441 |
| 5,426,747 | 6/1995 | Weinreb et al. | 395/413 |
| 5,435,004 | 7/1995 | Cox et al. | 395/439 |
| 5,452,444 | 9/1995 | Solomon et al. | 395/182.04 |
| 5,455,932 | 10/1995 | Major et al. | 395/489 |
| 5,513,314 | 4/1996 | Kandasamy et al. | 395/182.04 |
| 5,515,502 | 5/1996 | Wood | 395/182.13 |
| 5,530,855 | 6/1996 | Satoh et al. | 395/600 |
| 5,537,533 | 7/1996 | Staheli et al. | 395/182.03 |
| 5,537,585 | 7/1996 | Blickenstaff et al. | 395/600 |
| 5,544,347 | 8/1996 | Yanai et al. | 395/489 |
| 5,649,196 | 7/1997 | Woodhill et al. | 707/204 |

| | | | |
|---|---|---|---|
| 5,664,186 | 9/1997 | Bennett et al. | 707/204 |
| 5,689,689 | 11/1997 | Meyers et al. | 395/553 |

OTHER PUBLICATIONS

Gillooly, "Firm Offers High–end Mass Storage System for LANS".

Costlow, "DG Stets Up RAID Unit," *Electronic Engineering Times,* Sep. 21, 1992.

Dryden, "Fail–safe Subsystems Grow, RAID Components Shipping," *News & Analysis,* Sep. 12, 1992.

Alford, "Disk Arrays Explained," *Byte,* Oct. 1992.

Francis, "Getting Ready for PC RAID," *Datamation,* May 15, 1992.

Carr, "An Array of Protection for Server Data," *Data Communications,* May 1992.

O'Brien, RAID 7 Architecture Features Asynchronous Data Transfers, *Computer Technology Review,* Spring 1992.

Lawrence, "No More Data Loss: the Byte Lab Tests Six Disk–Array Subsystems," *Byte,* Aug., 1992.

McGee, "Hidden Expense," *System and Network Integration,* Jun. 29, 1992.

Costlow, "RAID Launch Gains Momentum," *Electronic Engineering Times,* 1992.

Dryden, "Users Cite RAID's Benefits and Concerns," *LAN Times,* May 25, 1992.

Bowden, "RAID: The Next Step in Disk Subsystems," *LAN Times,* May 25, 1992.

Robinson, "Network Disk Drives Help Efficiency," *Computing,* Oct. 4, 1992.

Patterson, et al., A Case for Redundant Arrays for Inexpensive Disks (RAID), *Report No. UCB.CSD 87/391,* Dec. 1987.

BACKUP SYSTEM THAT TAKES A SNAPSHOT OF THE LOCATIONS IN A MASS STORAGE DEVICE THAT HAS BEEN IDENTIFIED FOR UPDATING PRIOR TO UPDATING

RELATED APPLICATIONS

This application is a continuation-in-part of U.S. patent application Ser. No. 08/322,697 filed Oct. 13, 1994, now U.S. Pat. No. 5,649,152 entitled METHOD AND SYSTEM FOR PROVIDING A STATIC SNAPSHOT OF DATA STORED ON A MASS STORAGE SYSTEM, which is incorporated herein by reference.

BACKGROUND OF THE INVENTION

1. The Field of the Invention

The present invention relates to the protection of computer data, and more particularly to a system and method for backing up the data on one or more mass storage systems of one or more computers to a single backup system.

2. Present State of the Art

There is little question that computers have radically changed the way that businesses collect, manage, and utilize information. Computers have become an integral part of most business operations, and in some instances have become such an integral part of a business that when the computers cease to function, business operations cannot be conducted. Banks, insurance companies, brokerage firms, financial service providers, and a variety of other businesses rely on computer networks to store, manipulate, and display information that is constantly subject to change. The success or failure of an important transaction may turn on the availability of information which is both accurate and current. In certain cases, the credibility of the service provider, or its very existence, depends on the reliability of the information maintained on a computer network. Accordingly, businesses worldwide recognize the commercial value of their data and are seeking reliable, cost-effective ways to protect the information stored on their computer networks. In the United States, federal banking regulations also require that banks take steps to protect critical data.

Critical data may be threatened by natural disasters, by acts of terrorism, or by more mundane events such as computer hardware and/or software failures. Although these threats differ in many respects, they all tend to be limited in their geographic extent. Thus, many approaches to protecting data involve creating a copy of the data and placing that copy at a safe geographic distance from the original source of the data. Geographic separation may be an important part of data protection, but does not alone suffice to fully protect all data.

Often the process of creating a copy of the data is referred to as backing up the data or creating a backup copy of the data. When creating a backup copy of data stored on a computer or a computer network, several important factors must be considered. First, a backup copy of data must be logically consistent. A logically consistent backup copy contains no logical inconsistencies, such as data files that are corrupt or terminated improperly. Second, a backup copy of data must be current enough to avoid data staleness. The time between backups, which largely determines the staleness of the backup copy, must be sufficiently short so that the data on the backup is still useful should it be needed. For certain applications, such as networks that store financial transactions, backups a week old may be useless and much more frequent backups are needed. How frequent backup copies can be made is a function of many factors such as whether the backup can be made during normal business operations, the time it takes to make a backup copy, and so forth.

In order to create a backup copy of the data, several approaches have been taken. Each of the approaches has certain advantages and disadvantages. Perhaps the simplest approach to creating a backup copy of critical data is to copy the critical data from a mass storage system, such as the magnetic storage system utilized by a computer network, to a second archival mass storage device. The second archival mass storage device is often a storage device designed to store large amounts of data at the expense of immediate access to the data. One type of archival storage commonly utilized is magnetic tape. In these backup systems, data is copied from the mass storage system to one or more magnetic tapes. The magnetic tapes are then stored either locally or at a remote site in case problems arise with the main mass storage system. If problems arise with the mass main storage system, then data may be copied from the magnetic tape back to either the same or a different mass storage system.

Although utilizing magnetic tape or other archival storage as a means to guard against data loss has the advantage of being relatively simple and inexpensive, it also has severe limitations. One such limitation is related to how such backups are created. When data is copied from a mass storage system to a backup tape, the copy process generally copies the data one file at a time. In other words, a file is copied from the mass storage system onto the tape. After the copy is complete, another file is copied from the mass storage system to the tape. The process is repeated until all files have been copied.

In order to ensure the integrity of data being stored on the tape, care must be taken to keep the file from changing while the backup is being made. A simple example will illustrate this point. Suppose a file stores the account balances of all banking customers. If the account balances were allowed to change during the time the file is being backed up, it may be possible to leave a file in a logically inconsistent state. For example, if one account balance was backed up, and immediately after the account was backed up the account balance was debited $100.00, and if that same $100.00 was credited to a second account, then a situation may arise where the same $100.00 is credited to two different accounts.

In order to prevent such a situation from occurring, the data in a file must not change while the backup copy is made. A simple way to prevent data from changing is to prevent all access to the file during the backup procedure. In such a scheme, access to the files is cut off while the file is backed up. This approach is utilized by many networks where access to the mass storage system can be terminated after the close of business. For example, if a business closes at the end of each day and leaves its computer network essentially unused at night, user access to the network can be terminated at night and that time used to perform a backup operation. This, however, limits creation of a backup copy to once per day at off hours. This may be insufficient for some operations.

An increasing number of computer networks are used by computer businesses that operate world wide, and hence these networks may be needed twenty-four hours a day, seven days a week. Shutting down such a network for several hours each day to make a tape backup may have a significant adverse affect on the business. For such businesses, creating a backup tape in the traditional manner is simply impractical and unworkable.

In an attempt to accommodate such operations or to increase the frequency of backups, an approach to copying data stored on computer networks known as "data shadowing" is sometimes used. A data shadowing program cycles through all the files in a computer network, or through a selected set of critical files and checks the time stamp of each file. If data has been written to the file since the last time the shadowing program checked the file's status, then a copy of the file is sent to a backup system. The backup system receives the data and stores it on tapes or other media. The shadow data is typically more current than data restored from a tape backup, because at least some information is stored during business hours. However, shadow data may nonetheless be outdated and incorrect. For example, it is not unusual to make a data shadowing program responsible for shadowing changes in any of several thousand files. Nor is it unusual for file activity to occur in bursts, with heavy activity in one or two files for a short time, followed by a burst of activity in several other files. Thus, a data shadowing program may spend much of its time checking the status of numerous inactive files while several other files undergo rapid changes. If the system crashes, or becomes otherwise unavailable before the data shadowing program gets around to checking the critical files, data may be lost.

Another problem with data shadowing programs is that they typically do not work for data kept in very large files. Consider a system with a single very large database and several much smaller data files. Assuming that a business's primary information is stored in the large database, it is reasonable to expect that a large percentage of the business day will be spent reading and writing data to the very large database. Assuming that a backup copy could be made of the very large database, the time needed to make a backup copy of such a large database may make the use of data shadowing impractical. The data shadowing program may attempt to make copy after copy of the large database. Making such numerous copies not only takes a tremendous amount of time, but also requires a tremendous amount of backup storage space.

Another problem of data shadowing type systems is that open files are generally not copied. As previously described, a file must be frozen while a backup copy is made in order to prevent changes to the file during the backup process. Thus, data shadowing systems usually do not attempt to make copies of open files. If changes are constantly being made to large database, the large database will constantly be open and data shadowing systems may not copy the database simply because the file is open. For at least these reasons, data shadowing systems are typically not recommended for very large data files.

Another approach that has been attempted in order to overcome some of these limitations is a process whereby a time sequence of data is captured and saved. For example, many systems incorporate disk mirroring or duplexing. In disk mirroring or duplexing, changes made to a primary mass storage system are sent to another backup or secondary mass storage systems. In other words, when a data block is written to the primary mass storage system, the same data block is written to a separate backup mass storage system. By copying each write operation to a second mass storage system, two mass storage systems may be kept synchronized so that they are virtually identical at the same instant in time. Such a scheme protects against certain types of failures, but remains vulnerable to other types of failures.

The primary type of failure that disk mirroring overcomes is a hardware failure. For example, if data is written to two disks simultaneously, then if one disk fails, the data is still available on the other disk. If the two disks are connected to two separate disk controller cards, then if a single disk controller card or a single disk fails, then the data is still accessible through the other disk controller card and disk assembly. Such a concept can be extended to include entire systems where a secondary network server mirrors a primary server so that if a failure occurs in the primary network server, the secondary network server can take over and continue operation. The Novell® SFT line of products utilize variants of this technology.

While such systems provide high reliability against hardware failures and also provide almost instantaneous access to backup copies of critical data, they do not guard against software failures. As software becomes more and more complex the likelihood of software failures increase. In today's complex computing environments where multiple computer systems running multiple operating systems are connected together in a network environment, the likelihood of software errors causing occasional system crashes increases. When such a software error occurs, both the primary mass storage system and the mirrored mass storage system may be left in a logically inconsistent state. For example, suppose that a software error occurred during a database update. In such a situation, both the primary mass storage system and the mirrored mass storage system would have received the same write command. If the software error occurred while issuing the write command, both mass storage systems may be left in an identical, logically inconsistent state. If the mirrored mass storage system was the only form of backup in the network critical data could be permanently lost.

If the backup is to be made at a remote location, the problems with the above technology are exacerbated. For example, if disk mirroring is to be made to a remote site, the amount of data transferred to the remote site can be considerable. Thus, a high speed communication link must exist between the primary site and the secondary or backup site. High speed communication links are typically expensive. Furthermore, if a time sequence of data is to be sent to a backup system at a remote location over a communication link, then the reliability of the communication link becomes a significant issue. If for any reason the communication link should be temporarily severed, synchronization between the primary mass storage system and the secondary or backup mass storage system would be lost. Steps must then be taken to reconcile the two mass storage devices once the communication link is reestablished. Thus, mirroring a primary mass storage system at a remote site is typically difficult and very expensive.

The problems of backing up a single system to a remote site becomes even more complicated when a single remote site is to service several primary systems. Using a file-by-file backup method requires a significant amount of time if the mass storage devices of the primary systems are relatively large. In such a situation, a single night may not be sufficient to backup all primary sites to a single remote site. Thus, in some situations, a file-by-file transfer method cannot be used. Similar problems exist with remote disk mirroring technology. Since a remote disk mirror typically requires a dedicated communication link, the backup system must be sufficiently fast to handle communications from a plurality of dedicated communication lines. The amount of data that must be received and stored by the backup system may quickly overwhelm the capabilities of the backup system.

It would, therefore, represent an advancement in the art to have a backup system that could ensure that a logically consistent backup was created. It would also represent an advancement in the art to have a backup system that allowed data to be backed up without terminating user access to the mass storage system. Furthermore, it would be highly desirable to have a backup system that could backup open computer files. It would also be extremely desirable to have a backup system that could backup files as they changed in order to reduce the time needed to create a backup copy. It would be highly desirable to have a single backup system that could service a plurality of primary systems. Finally, it would also represent an advancement in the art to have a backup system that could accomplish these functions either locally or remotely using a low bandwidth communication link.

SUMMARY AND OBJECTS OF THE INVENTION

The foregoing problems in the prior state of the art have been successfully overcome by the present invention, which is directed to a system and method for backing up a primary mass storage device to a backup storage device. The current system and method provides three significant advantages over the prior art. First, the backup system and method of the present invention reduces the amount of data needed to make a backup by backing up only those data blocks of the primary mass storage device that change. Second, the system and method of the present invention emphasize security of the backup by ensuring that the primary storage device is in a logically consistent state when a backup is made. Third, because the data needed to make a backup is reduced to the absolute minimum, and because backups are only made of logically consistent states, backup frequency can be increased in order to capture many more logically consistent states. The backup system and method of the present invention accomplishes this without terminating user access to the mass storage system.

The present invention begins with the assumption that a primary mass storage device connected to a primary computer and a backup storage system connected to a backup storage device contain identical data. This may be accomplished, for example, by making a complete copy of the primary mass storage device to the backup device using either traditional backup techniques or traditional disk mirroring techniques. Once the primary mass storage device and the backup storage device contain the same data, the present invention tracks the changes made to the primary mass storage device. This tracking is done by identifying those storage locations on the primary mass storage device that have new data written in them from the time that the backup storage device was in sync with the primary mass storage device. By identifying those changes that have been made to the primary mass storage device, the invention identifies those changes that need to be made to the backup storage device in order to bring the backup storage device current with the primary mass storage device.

Once the changes that need to be made to the backup storage device have been identified, the changes are sent to the backup system. The backup system then has available all data to bring the backup storage device current with the primary mass storage device. In order to preserve the original data of the primary mass storage device during the backup process, a static snapshot of the primary mass storage device is taken. This static snapshot captures the changes that have been made to the primary mass storage device and that need to be transferred to the backup system.

In order to make the backup transparent to users, it is preferred that the static snapshot be taken in such a way that user access to the primary mass storage device is not interrupted.

The present invention includes a mechanism to identify when the primary mass storage device is in a logically consistent state in order to determine when a static snapshot should be made. By identifying a logically consistent state and the taking a static snapshot of the changes made up to that point in time, when the changes are transferred to the backup system, the backup system is guaranteed to capture a logically consistent state. By capturing snapshots of succeeding logically consistent states, the backup can capture one logically consistent state after another. In this way, if the backup data should ever be needed, the backup data will be in a logically consistent state. The backup system moves from one logically consistent state to another logically consistent state thus eliminating one of the problems of the prior art.

Because the present invention takes a data block approach to the backing up of a mass storage system, the present invention minimizes the amount of data that needs to be transferred to make a backup to the absolutely minimum possible. For example, if a large database has five records that change, prior art systems would copy the entire large database. The present invention, however, copies only the five records that have changed. Because the amount of data is minimized, the present invention is particularly well suited to backing up data to a backup system located at a remote site. The present invention can utilize low bandwidth communication links to transfer backup data to a remote backup site. As an example, in many cases conventional dial-up telephone lines with a 56.6 k baud modem will be entirely adequate for many situations.

Because the data needed to make a backup copy is minimized through the present invention, a series of backup copies may be made, one after the other. This allows the state of a single mass storage system to be captured with greater frequency. In addition, a single centralized backup system may support a plurality of primary servers so that each can be backed up to the same backup system.

Accordingly, it is a primary object of the present invention to provide a system and method for mass storage backup that minimizes the amount of data that needs to be transferred to a backup system.

Another central object of the present invention is to provide a system and method for mass storage backup that can capture logically consistent states so that the backup is not left in a logically inconsistent state.

Yet another object of the present invention is to allow the backup system to capture successive logically consistent backup states in order to provide a series of logically consistent backup states.

Additional objects and advantages of the present invention will be set forth in the description which follows, and in part will be obvious from the description, or it may be learned by practice of the invention. The objects and advantages of the invention may be realized and obtained by means of the instruments and combinations particularly pointed out in the attended claims. These and other objects and features of the present invention will become more fully apparent from the following description and appending claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The following invention is described by using flow diagrams to describe either the structure or the processing of certain embodiments to implement the system and method of the present invention. Using the diagrams in this manner to present the invention should not be construed as limiting of its scope. The present invention contemplates both a system and method for backing up a primary mass storage device to a backup storage device. The presently preferred embodiment of the system for backing up a primary mass storage device to a backup storage device comprises one or more general purpose computers. The system and method of the present invention, however, can also be used with any special purpose computers or other hardware systems and all should be included within its scope.

Embodiments within the scope of the present invention also include computer-readable media having encoded therein computer-executable instructions. Such media can be any available media which can be accessed by a general purpose or special purpose computer. By way of example, and not limitation, such computer-readable media can comprise RAM, ROM, EEPROM, CD-ROM or other optical disk storage, magnetic disk storage or other magnetic storage devices, magneto-optical storage devices, or any other medium which can be used to store the desired program code means and which can be accessed by a general purpose or special purpose computer. Combinations of the above should also be included within the scope of computer-readable media. In turn, registers of a CPU or other processing unit that store computer-executable instructions while decoding and executing the same are also included within the scope of the computer-readable media.

Computer-executable instructions comprise, for example, executable instructions and data which cause a general purpose computer or special purpose computer to perform a certain function or a group of functions.

Figure 1:
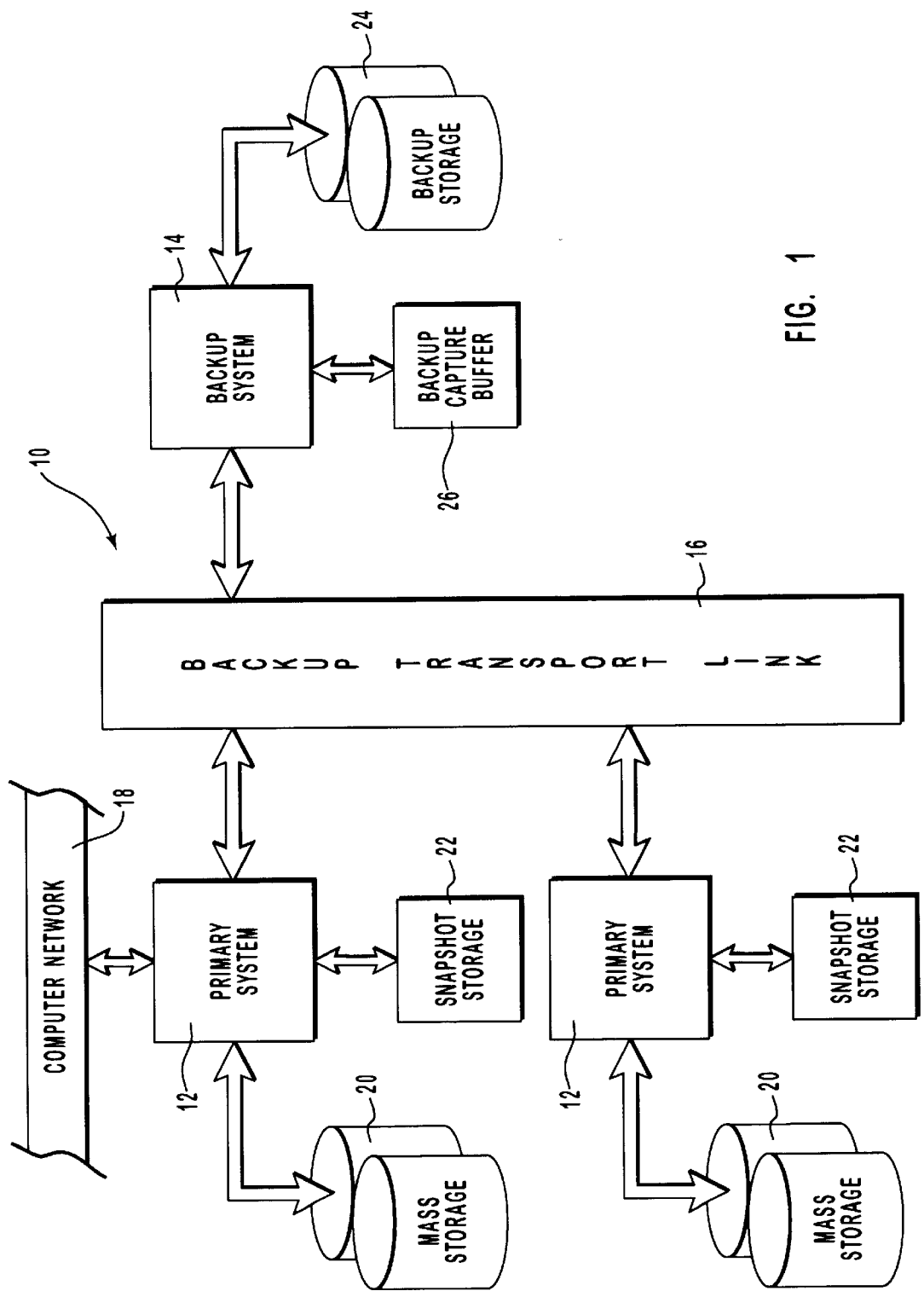
FIG. 1 is block diagram representing a system of the present invention.

Referring now to FIG. 1, a system level block diagram of one embodiment of the present invention is presented. The system, shown generally as 10, comprises one or more primary systems 12, a backup system 14, and backup transport means for transporting data between primary system 12 and backup system 14. In FIG. 1, the backup transport means is illustrated as backup transport link 16. In FIG. 1, primary system 12 may be any type of networked or stand alone computer system. For example, primary system 12 may be a network server computer connected to a computer network such as computer network 18. Primary system 12 may also be a stand alone system. Primary system 12 may also be a backup or standby server of a computer network connected to a primary server. The present invention can be used with any type of computer system. In this sense, the term "primary" is not meant to define or describe a computer system as a primary network server (as opposed to a backup or standby network server). In this description, the term "primary" is used to refer to the fact that the system has attached mass storage means for storing a copy of the data that is to be backed up. In other words, the term "primary" is used to differentiate the system from backup system 14.

Primary system 12 has attached thereto mass storage means for storing a plurality of data blocks in a plurality of storage locations. Each of the storage locations is specified by a unique address or other mechanism. Mass storage means can be any storage mechanism that stores data which is to be backed up using the present invention. For example, such mass storage means may comprise one or more magnetic or magneto-optical disk drives. It is, however, presumed that such mass storage means has a plurality of storage locations that can be used to store data blocks. The storage locations are addressed by a unique address or index so that a particular data block may be written thereto or retrieved therefrom. In FIG. 1, for example, such mass storage means is illustrated by mass storage device 20.

The term "data block" will be used to describe a block of data that is written to or read from mass storage means. The term "data block" is intended to be broadly construed and should include any size or format of data. For example, the data stored in an individual sector on a disk is properly referred to as a data block. The amount of data stored in a group or cluster of sectors may also properly be referred to as a data block. If the mass storage means is a RAM or other word or byte addressable storage device, the term data block may be applied to a byte, a word, or multiple word unit of data.

As described in greater detail below, embodiments within the scope of this invention use a static snapshot of all or part of the mass storage device during the backup process. Embodiments within the scope of this invention therefore comprise preservation memory means for storing data blocks of said mass storage means so as to create a static snapshot of the mass storage means at a particular point in time. As described in greater detail below, such preservation memory means may comprise any type of writable storage device such as RAM, EEPROM, magnetic disk storage, and the like. Such preservation memory means may also comprise a portion of mass storage device 20. In FIG. 1, such preservation memory means is illustrated, for example, by snapshot storage device 22. Preservation memory means is discussed in greater detail below.

Since primary system 12 may be any type of general purpose or special purpose computer, primary system 12 may also comprise any other hardware that makes up a general purpose or special purpose computer. For example, primary system 12 may also comprise processor means for executing programmable code means. The processor means may be a microprocessor or other CPU device. The processor means may also comprise various special purpose processors such as digital signal processors and the like. Primary system 12 may also comprise other traditional computer components such as display means for displaying output to a user, input means for inputting data to primary system 12, output means for outputting hard copy printouts, memory means such as RAM, ROM, EEPROM, and the like.

Backup system 14 of FIG. 1 comprises backup storage means for storing data blocks received from primary system 12. Backup storage means can comprise any type of storage device capable of storing blocks of data received from a primary system. For example, backup storage means may comprise a storage device identical to the mass storage device of a primary system. If the primary system has a large magnetic disk, for example, the backup storage means may also comprise a large magnetic disk. If the backup storage means is the same as the mass storage means of the primary system, the backup storage means can closely mirror the mass storage means of the primary system. As another example, backup storage means may comprise archival storage devices such as a magnetic tape drive or an optical or magneto-optical drive. The type of storage devices that may be used for backup storage means is limited only by the particular application where they are utilized. In some situations it may be more desirable to have a backup storage means that more closely resembles the mass storage means of the primary system. In other situations it may be perfectly acceptable to have archival type storage means that are optimized to store large amounts of data at the expense of rapid access, storage means be able to store the backup storage means be able to store data blocks transferred to the backup system from the mass storage means of the primary system. In FIG. 1 the backup storage means is illustrated by backup storage device 24.

As described in greater detail below, backup storage system 14 may comprise backup capture means for storing data blocks transferred to backup system 14 until all such data blocks have been received. Because the present invention transfers only certain data blocks, a situation can arise where a logically inconsistent state is created if only some of the data blocks are applied to backup storage device 24. In order to prevent this from happening, it may be desirable to save the transferred data blocks in a separate location, such as the backup capture means, until all data blocks have been received. This ensures that a complete group of data blocks are received before any action is taken. Backup capture means can comprise any type of storage that can store data blocks received from primary system 12. For example, backup capture means may comprise RAM, magnetic disk storage, or any other storage medium. It is preferred, however, that backup capture means have sufficient speed to be able to store data blocks as they are received. Backup capture means must also provide data blocks to backup system 14 so that backup system 14 can transfer the data blocks to its attached backup storage means. In FIG. 1, the backup capture means is illustrated by backup capture buffer 26.

In order to transfer data between primary system 12 and backup system 14, backup transport link 16 is used. Backup transport link 16 is one illustration of backup transport means for transporting data between primary system 12 and backup system 14. Backup transport link 16 may comprise any combination of hardware and/or software needed to allow data communications between primary system 12 and backup system 14. For example, backup transport link 16 may be a local area network (LAN), a wide area network (WAN), a dial-up connection using standard telephone lines or high speed communication lines, the internet, or any other mechanism that allows data to flow between primary system 12 and backup system 14. As explained in greater detail below, the present invention is designed to minimize the amount of data that flows between primary system 12 and backup system 14 so that only that data necessary to bring backup storage means, such as backup storage device 12, current with respect to the primary mass storage means, such as mass storage device 20 is transferred. This allows backup transport link 16 to encompass a wider variety of technologies that cannot be used with prior art systems. The bandwidth requirements for backup transport link 16 are typically very modest and a 56.6 k baud dial-up connection will be entirely adequate for many purposes.

Figure 2:
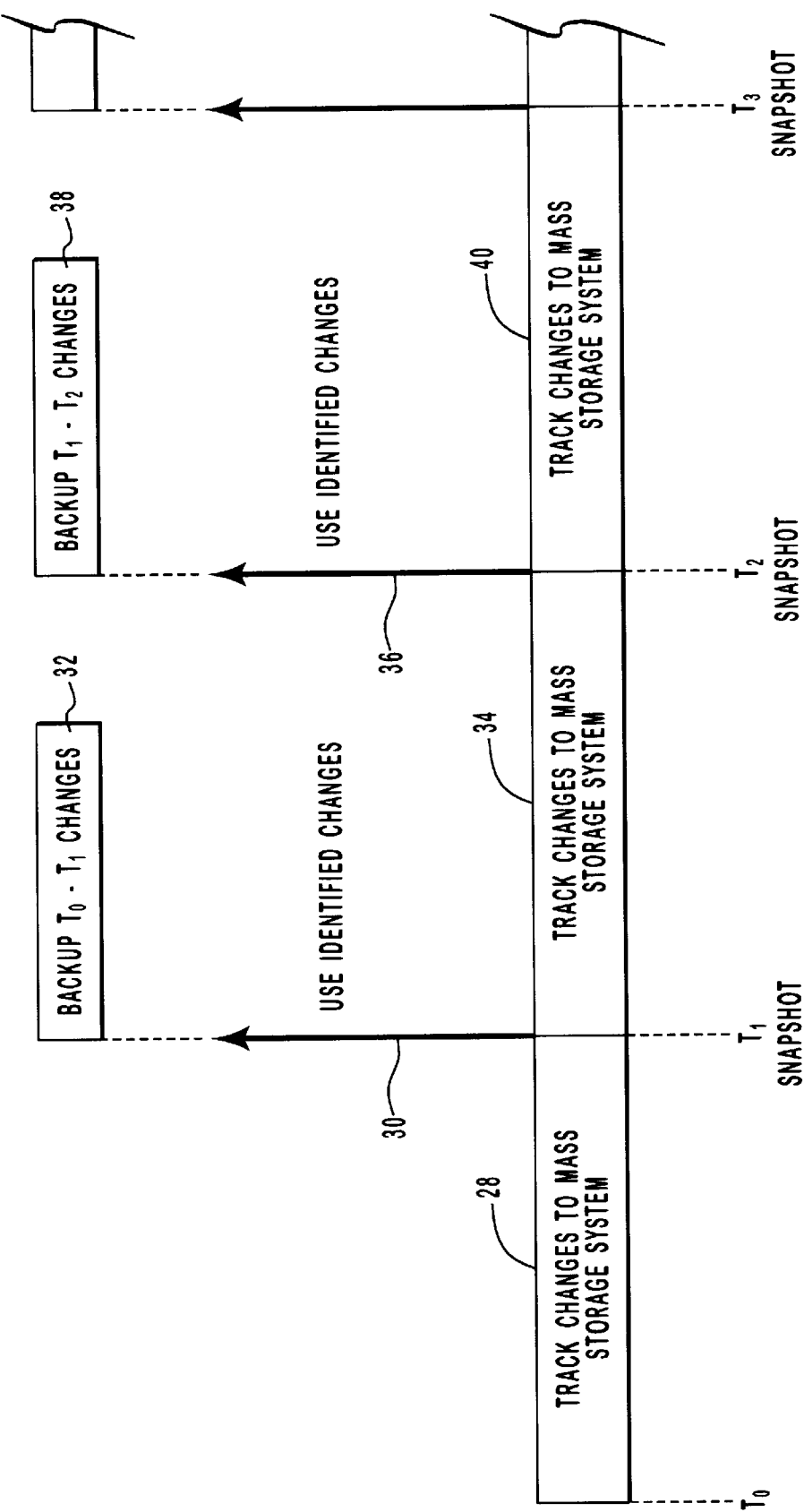
FIG. 2 a diagram illustrating the timing of one method of the present invention.

Referring next to FIG. 2, an overview of the method used to backup a mass storage means, such as mass storage device 20 of FIG. 1, to a backup storage means, such as backup storage device 24 of FIG. 1, is presented. Initially, the method illustrated in FIG. 2 presumes that the mass storage device and the backup storage device are current. In other words, the backup storage device contains a copy of the data stored on the mass storage device. This may be accomplished using any number of conventional technologies. The type of technology used will depend in large measure on the type of media used for the backup storage device. For example, if the backup storage device is a disk similar to a disk used for the mass storage device, then disk mirroring or other means may be used to copy the data from the mass storage device to the backup storage device. On the other hand, if the backup storage device utilizes magnetic tape or other archival type storage, then a backup may be made in the conventional way that such archival tape backups are made. In FIG. 2, the backup storage device is assumed to have a current copy of the data stored on the mass storage device at time $T_0$.

Beginning at time $T_0$, the method summarized in FIG. 2 maintains the backup storage device in a current state with respect to the mass storage device. The method summarized in FIG. 2 captures successive logically consistent states. This results in the backup storage device either moving from one logically consistent state to a subsequent logically consistent state or allows the backup storage device to capture succeeding logically consistent states. This creates a tremendous advantage over prior art systems which may leave the backup storage device in a logically inconsistent state. By ensuring that the backup device is in a logically consistent state, the present invention ensures that a useable backup is always available.

Returning now to FIG. 2, beginning at time $T_0$ the changes to the mass storage system are tracked. This is illustrated in FIG. 2 by block 28. The changes are preferably tracked by identifying storage locations of the mass storage device that have new data written in them starting at time $T_0$. As explained in greater detail below, this may be done by keeping a map which identifies those storage locations that have new data written in them starting with time $T_0$. Alternatively, a list of the storage locations that have new data written in them beginning at time $T_0$ may be kept.

At some point in time, it is desirable to capture the changes that have been made and to transfer those changes to the backup system. In a preferred embodiment, the system identifies logically consistent state of the mass storage device and takes a static snapshot of at least those storage locations that have been changed since time $T_0$. In FIG. 2, the logically consistent state is identified as time $T_1$ and a snapshot is taken.

A static snapshot is designed to preserve data as it is exists at a particular point in time so that the data will be available after that particular point in time in its original state even though changes are made to the mass storage system after the snapshot time. Many ways exist of creating such a static snapshot. Any method will work with the present invention, however, some methods are preferred over others due to various advantages. The details of how a static snapshot is taken and a preferred method for creating a static snapshot is presented below. For this summary, however, it is important to understand that any method which creates a static snapshot can be used with the present invention. It is, however, preferred that the static snapshot be taken without terminating user read or write access to the mass storage device.

At time $T_1$, the changes identified between time $T_0$ and time $T_1$ are backed up by sending them to the backup storage device. This is illustrated in FIG. 2 by arrow 30 and block 32. The changes are sent to the backup storage device by sending the data stored in only those storage locations where new data was written between time $T_0$ and time $T_1$. Since the data is preserved by a snapshot at time $T_1$, the data will be available for transfer to the backup storage device even though new data is written to the mass storage device after time $T_1$. The map or other mechanism that was used to track which storage locations had data written therein between time $T_0$ and time $T_1$ is used to identify the data that should be transferred to the backup storage device. Note that only those data blocks that were changed between time $T_0$ and $T_1$, are transferred. Thus, only incremental changes are sent and entire files are not transferred unless the entire file changes.

As explained in greater detail below, as the data is received by the backup storage device, it is preferably buffered in a temporary location until all the data from time $T_0$ to time $T_1$ has been transferred. Once all the data has been transferred, then the changes may be applied to the backup storage device in order to bring the backup storage device current to time $T_1$. Alternatively, the changes between time $T_0$ and $T_1$ may be kept as an incremental backup so that the logically consistent state at time $T_0$ and the logically consistent state at time $T_1$ can be reconstructed if desired.

Since new data may be written to the mass storage device after time $T_1$ while the backup is being performed, a mechanism must be in place to identify the changes that are made after time $T_1$ if another backup is to be made after time $T_1$. In FIG. 2, the changes after time $T_1$ are tracked as indicated by block 34. This will allow the changes made after time $T_1$ to also be transferred to the backup storage device in order to bring the backup storage device current to some later time.

As illustrated in FIG. 2, the sequence described above repeats itself at time $T_2$. This is illustrated by arrow 36, block 38, and block 40. As described previously, the snapshot taken at time $T_2$ should represent logically consistent state so that when the changes made between times $T_1$ and $T_2$ are transferred to the backup storage device, the backup storage device is brought current to the logically consistent state at time $T_2$.

From the summary given above, several observations can be made. The first observation is that the present invention backs up only the data stored in the storage locations that were changed since the last backup. This creates a significant advantage over the prior art. For example, consider a database where only a very few data records are changed. Prior art systems would attempt to backup the entire database if a change had been made. The present invention, however, only backs up those data blocks that have been changed due to the few records that were changed. This means that the time needed to make the backup of the database and the storage requirements to make the backup of the database are dramatically reduced over the prior art.

Another important difference from the prior art is highlighted in the above description. The present invention captures the data as it is exists when the snapshot is taken. The present invention does not try to send to the backup storage device the time sequence of changes that were made to the mass storage device. For example, if a single record of the database was changed ten times between the time the last backup was made and the current backup time, certain prior art systems would send ten changes to the backup storage device. The present invention, however, simply sends the last change that was made before the current backup time. In this example, such a scheme reduces the amount of data sent to the backup device by ten times. The present invention reduces the amount of data sent to the backup device to the very minimum needed to make a logically consistent backup. This allows the communication link between the primary system and the backup system to be much lower bandwidth than prior art systems. The present invention is, therefore, ideally suited to embodiments where the backup system is situated at a remote site from the primary system. When the backup system is situated at a remote site, conventional dial-up telephone lines may be used to transfer backup data between the primary system and the backup system.

The present invention also supports a many-to-one backup embodiment. For example, consider the situation presented in FIG. 1 where an embodiment comprises a single backup system and a plurality of primary system. The backup system could be situated either remotely or locally. The backup system could then initiate contact with one primary system, receive the changes that have occurred since the last backup of that system, and terminate the connection. A connection would then be established to another primary system and the backup system could receive the changes that occurred on that primary system since the last backup. Thus, the backup system contacts each primary system in turn and receives the changes that have occurred since the last time the primary system was contacted. Such an embodiment may be of great value to a business with many branch offices where copies of the data from these branch offices are to be stored at a central location.

Figure 3:
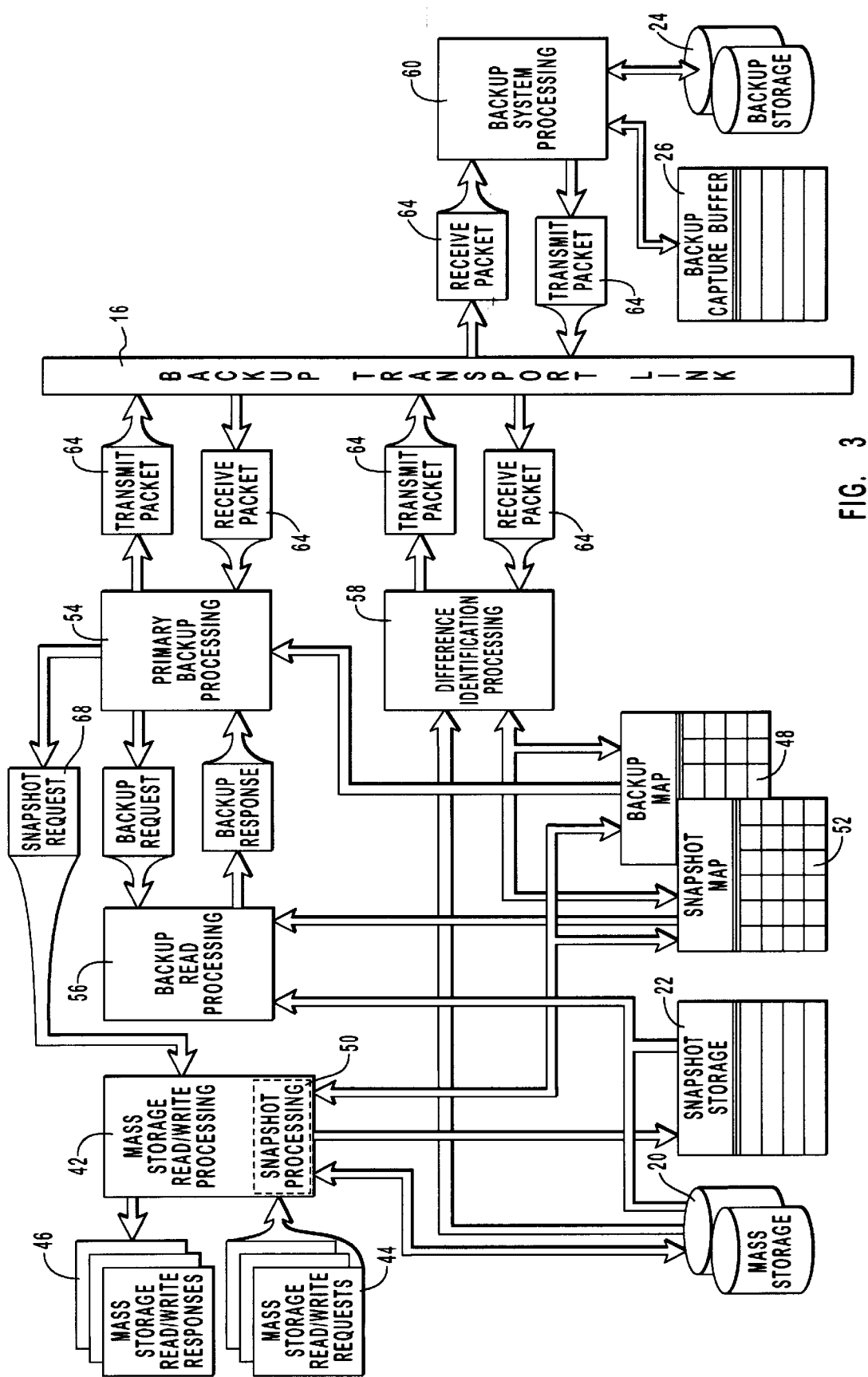
FIG. 3 is a system level block diagram of one embodiment of the present invention.

Turning next to FIG. 3, a top level diagram of one embodiment to implement the method summarized in FIG. 2 is presented. The following description presents a top level overview of each of the processing blocks illustrated in FIG. 3. The details of each processing block are then presented.

During normal operation of a computer system, data is periodically written to or read from attached mass storage means such as mass storage device 20. Embodiments within the scope of this invention therefore comprise means for writing data to a mass storage device and means for reading data from a mass storage device. In FIG. 1, such means is illustrated, for example, by mass storage read/write processing block 42. Although the details of mass storage read/write processing block 42 are presented later, the basic function of mass storage read/write processing block 42 is to write a data block to an identified storage location on mass storage device 20 or read a data block from an identified storage location on mass storage device 20. In FIG. 3, requests to read or write a data block from or to an identified storage location are illustrated by mass storage read/write requests 44. Whenever a read or write is requested, mass storage read/write processing block 42 can return a response as illustrated by mass storage read/write response 46. The responses can include a completion code or other indicator of the success or failure of the requested operation and, in the case of a read request, the data requested.

As described in conjunction with FIG. 2, a method of the present invention tracks changes that occur between a first instant in time and a second instant in time. Embodiments within the scope of this invention therefore comprise means for identifying which storage locations of mass storage device 20 have had new data stored therein between a first instant in time and a second instant in time. Any method for identifying and tracking such locations can be utilized with the present invention. All that is necessary is that the storage locations that have had new data stored in them since the last backup be able to be identified. In FIG. 3 such means is illustrated, for example, by backup map 48. Backup map 48 may comprise a boolean entry for each storage location on mass storage device 20. When a storage location has new data written in it, the entry for the storage location may then be set. Alternatively, a list of storage locations that have new data stored in them may also be kept. All that is required is the ability to distinguish and identify storage locations that have had new data stored therein since a particular point in time.

As previously described, when a backup is to be made, a static snapshot of at least the storage locations that are to be backed up is made. Embodiments within the scope of this invention therefore comprise means for preserving a static snapshot at a particular instant in time. The use of a static snapshot to preserve at least the storage locations that are to be backed up to a backup system is preferred because it allows users to continue to access mass storage device 20 while the changes are being backed up. Since it takes a period of time to transfer the changes from the primary system to the backup system, the data that is to be transferred must remain unchanged until it is transferred. One way to ensure that the data remains unchanged is to prevent access to mass storage device 20. This will prevent any data from being written to mass storage device 20 and ensures that the data to be backed up remains unchanged until it can be transferred to the backup system. Unfortunately, this solution is highly undesirable. It is, therefore, preferred that when changes are to be transferred to the backup system, a static snapshot of at least the data that will be transferred is taken. Such a static snapshot will preserve the data to be transferred in its original condition until it can be transferred while simultaneously allowing continued access to mass storage device 20 so that data can continue to be written thereto or read therefrom.

Any method of preserving a static snapshot can be used with the present invention. However, it is preferred that whatever method is used be able to preserve a static snapshot without interrupting access to mass storage device 20. In other words, it is preferred that the static snapshot be preserved in such a way that users can continue to read data from or write data to mass storage device 20.

In FIG. 3, the means for preserving a static snapshot is illustrated by snapshot processing block 50. As illustrated in FIG. 3, it may make sense to incorporate the snapshot processing mechanism into the mass storage read/write processing block. Although the details of snapshot processing block 50 are presented below, one preferred embodiment preserves a static snapshot by copying a data block that is to be overwritten from mass storage device 20 into snapshot storage 22 and then indicating that the block has been preserved in snapshot map 52. Once a copy has been placed into snapshot storage 22, then the copy of the data block on mass storage device 20 can be overwritten.

As described above in conjunction with FIG. 2, if a series of successive backups are to be made, it is necessary to track the changes made to a mass storage device, such as mass storage device 20, during the time that a backup is being made. In other words, it may be necessary to track changes made to mass storage device 20 after a snapshot is made. Embodiments within the scope of the present invention can comprise means for identifying the storage locations of a mass storage device that have new data stored therein after the point in time that a snapshot is made. Any type of mechanism that tracks and identifies storage locations of a mass storage device that have new data stored therein after a particular point in time can be utilized. For example, a map similar to backup map 48 may be used. As another example, a list of data locations that have new data stored therein after a particular point in time may also be used. Depending on the type of snapshot mechanism used, the snapshot mechanism may inherently track such information. In such an embodiment, this information may be saved for later use. In FIG. 3, such means is illustrated by snapshot map 52. As described in greater detail below, one implementation of a snapshot mechanism tracks storage locations with new data stored therein after the snapshot is made in a snapshot map, such as snapshot map 52 of FIG. 3.

Embodiments within the scope of this invention comprise means for transferring data blocks that are to be backed up to a backup system. In FIG. 3 such means is illustrated, for example, by primary backup processing block 54. Although the details of primary backup processing block 54 are presented in greater detail below, the general purpose of primary backup processing block 54 is to take data blocks that are to be backed up and transfer those data blocks to a backup system using an appropriate protocol. As described in conjunction with FIG. 2, and as described in greater detail below, the data blocks to be transferred will be those data blocks that have been stored in storage locations on the mass storage device since the last backup.

Primary backup processing block 54 may incorporate functionality to either initiate a backup and transfer data to the backup system or respond to a backup initiated by the backup system. In this way, either the primary system or the backup system can initiate a backup. The details of how backups may be initiated by either the primary system or the backup system are presented in greater detail below.

In the discussion of FIG. 2 that presented an overview of a method of the present invention, a static snapshot was used to preserve the state of changed data blocks at a particular point in time. Those changed data blocks were then backed up to a backup system. If changed data blocks are preserved by a static snapshot, then before the data blocks can be transferred to a backup system they must be retrieved from the snapshot. Embodiments within the scope of this invention may, therefore, comprise means for retrieving data blocks that were preserved by a static snapshot. Such means may be part of the means for transferring data blocks to the backup system or such means may be separate. In FIG. 3, the means for retrieving data blocks that were preserved by a static snapshot is illustrated by backup read processing block 56. The details of one embodiment of backup read processing block 56 are presented below. This processing block retrieves preserved data from its storage location and passes a retrieved data block to primary backup processing block 54 for transfer to the backup system. This functionality may also be incorporated into primary backup processing block 54. However, in order to emphasis the function performed by backup read processing block 56, the block is illustrated separately in FIG. 3.

The present invention is designed to capture one or more logically consistent backup states at the backup system. In order to capture these logically consistent backup states, embodiments within the scope of this invention may comprise means for determining when a logically consistent state has been achieved. A logically consistent state is a state where no logical inconsistencies such as improperly terminated files exist on the mass storage system. A logically consistent state may be identified by a number of mechanisms. For example, a logically consistent state may be identified by watching the activity on the mass storage device. When no activity exists on a mass storage device, it may generally be presumed that all internal data buffers have been flushed and their data written to the mass storage system and the mass storage system is not in a state where data blocks are being updated. In addition, APIs may exist that can be called to identify when a logically consistent state has been reached. For example, the operating system or other program may have an API call that may be made that will return when a logically consistent state has been reached. As yet another example, the system may broadcast a message to all users connected to a network that a snapshot will be taken at a given time. Users can then take appropriate steps, if necessary, to ensure a logically consistent state of their files. Other mechanisms may also be used. As described in greater detail below, the means for determining when a logically consistent state has been achieved may be incorporated into one of the processing blocks of FIG. 3, as for example, primary backup processing block 54.

When successive backups are to be made to a backup system by the present invention, embodiments within the scope of this invention may comprise a mechanism or means for identifying differences that exist between the mass storage device of the primary system, as for example mass storage device 20 of FIG. 3, and the backup storage device, as for example backup storage device 24 of FIG. 3. Such a mechanism may be useful when, for whatever reason, it is unclear if differences exist between mass storage device 20 and backup storage device 24. For example, suppose that the backup system crashed or the primary system crashed or otherwise became unavailable for a period of time. When the backup system or primary system again becomes available, it may be impossible to identify exactly what specific differences exist between mass storage device 20 and backup storage device 24. It may, therefore, be desirable to identify any differences so that the data blocks which are different may be transferred from mass storage device 20 to backup storage device 24 in order to bring backup storage device 24 current with mass storage device 20. Embodiments within the scope of this invention may therefore comprise means for identifying differences between data stored in the plurality of storage locations on a mass storage device and data stored on a backup storage device. In FIG. 3, such means is illustrated, for example, by difference identification processing block 58. Although the details of difference identification processing block 58 are presented below, the block is responsible to identify any differences that exist between mass storage device 20 and backup storage device 24. This block can place appropriate entries into backup map 48 or snapshot map 52 to track identified differences.

Embodiments within the scope of this invention comprise a backup system that stores data blocks transferred from one or more primary systems. In FIG. 3, the processing that occurs on such a backup system is illustrated by backup system processing block 60. As discussed in greater detail below, backup system processing block 60 receives data blocks via backup transport link 16 and stores them on backup storage device 24. As previously described, backup storage device 24 may be any type of storage device that can store the data blocks received from one or more primary systems. For example, the storage device may be a disk drive similar to a disk drive used for mass storage on a primary system. As another example, backup storage device 24 may be any archival storage medium such as magnetic tape. As another example, backup storage device 24 may be optical disks or a plurality of optical disks. All that is required is that the backup storage device be able to store the data blocks received from one or more primary systems in a format where they can be retrieved if necessary in order to recover data lost by a mass storage device at a primary system. If more than one primary system is serviced by a single backup system, it may be desirable to have separate backup storage devices for each primary system or it may be desirable to have a single backup storage device that serves all primary systems.

As illustrated in FIG. 3, data packets are exchanged between backup system processing block 60 and one or more processing blocks on a primary system, such as primary backup processing block 54 and difference identification processing block 58. These data packets are exchanged using a protocol appropriate to the amount of data transferred and the particular details of backup transport link 16. The communication between the primary system processing blocks and the backup system processing blocks are illustrated by transmit and received packets 64. The details of how transmit and receive packets 64 are formatted are not important for the purposes of this invention. The format will in large measure be determined by the details of backup transport link 16. For example, if backup transport link 16 is a local area network then transmit and receive packet 64 will be formatted according to the conventions of the local area network. If backup transport link 16 is a dial-up connection using telephone lines, then the transmit and receive packet 64 will be any number of conventional communication protocols used to transfer data between computer systems over telephone lines. If backup transport link 16 is the internet, then transmit and receive packet 64 will be formatted according to one of the internet transfer protocols. Other connections may require other packet formats or communication protocols. All that is important for the current invention is that the data identified herein be able to be exchanged between the primary system and the backup system.

Figure 4:
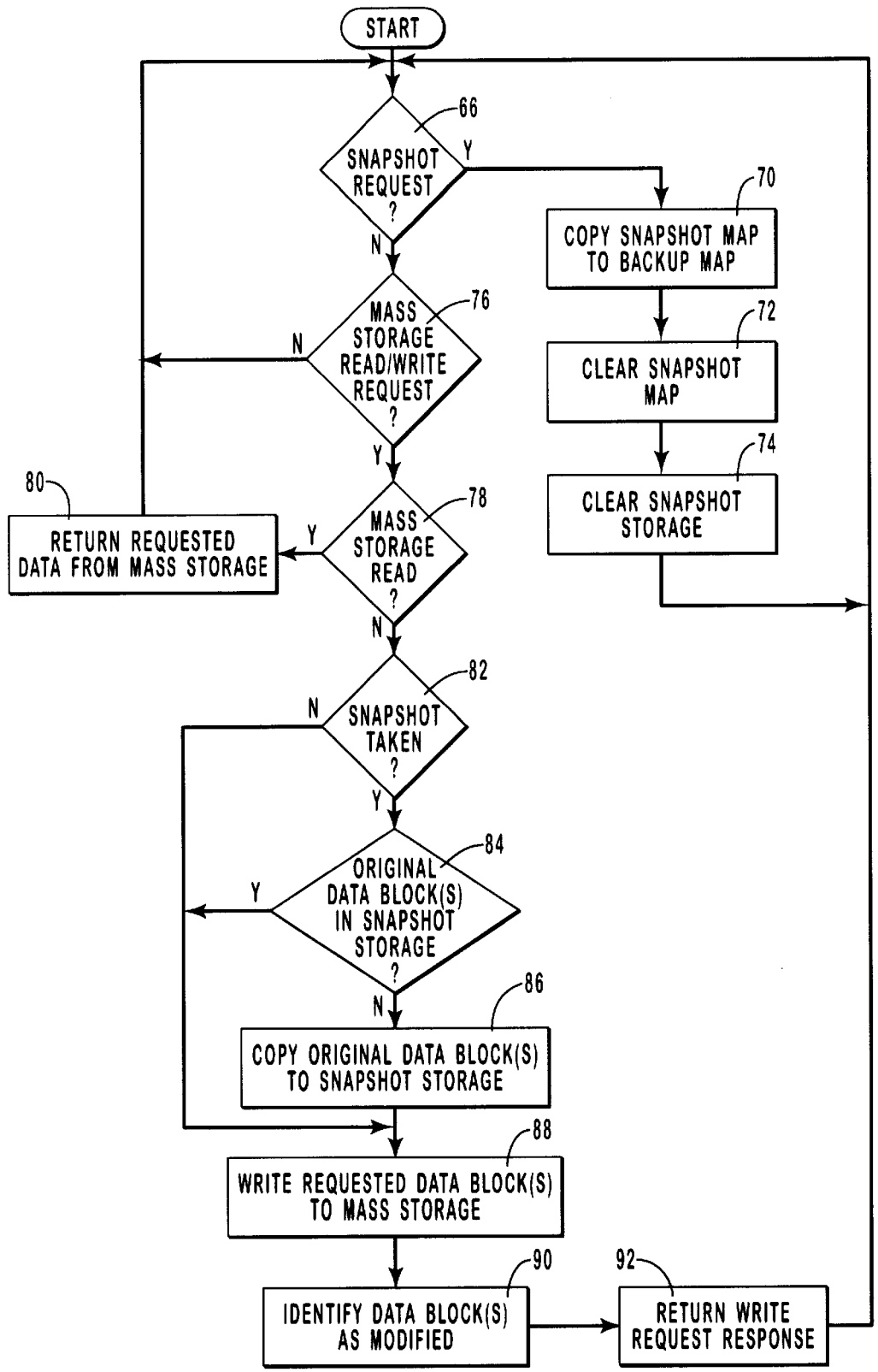
FIG. 4 illustrates the processing details of one embodiment of the mass storage read/write process block of FIG. 3.

Referring now to FIG. 4, one embodiment of mass storage read/write processing block 42 is presented. As previously described, the function of mass storage read/write processing block 42 is to read data from or write data to mass storage device 20. In addition, assuming that snapshot processing block 50 has been incorporated into read/write processing block 42, then processing block 42 will also be responsible for preserving and maintaining a static snapshot of mass storage device 20 at a particular point in time. The implementation presented in FIG. 4 incorporates snapshot processing block 50 as an integral function. As previously described, however, it would also be possible to implement snapshot processing block 50 separately. The choice as to whether to incorporate snapshot processing block 50 into mass storage read/write processing block 42 or whether to implement snapshot processing block 50 separately is considered to be a design choice that is largely unimportant for purposes of the present invention. The important aspect for the present invention is to include the capability to read data from or write data to mass storage device 20 and the capability to preserve and maintain a static snapshot of at least a portion of mass storage device 20 at a particular point in time.

Turning now to FIG. 4, decision block 66 first tests whether a snapshot request has been made. This decision block identifies whether the snapshot processing functionality incorporated into mass storage read/write processing block 42 should take a snapshot of at least a portion of mass storage device 20 of FIG. 3. The snapshot request can come from the backup system or from another processing block of the primary system. Returning for a moment to FIG. 3, a snapshot request is illustrated by snapshot request 68. As illustrated in FIG. 3, snapshot request 68 is generated by primary backup processing block 54. As described in greater detail below, it is preferred that primary backup processing block 54 issue snapshot request 68. Primary backup processing block 54 first identifies a logically consistent state before issuing such a snapshot request. In the alternative, the means for identifying a logically consistent state may be incorporated into the snapshot processing capability of mass storage read/write processing block 42 so that a snapshot request may be initiated either by the primary system or by the backup system and mass storage read/write processing block 42 would then identify a logically consistent state and take a snapshot. Such details are design choices and are not important from the point of view of this invention.

Returning now to FIG. 4, if a snapshot request has been received, then the next step is to preserve a static snapshot of at least a portion of mass storage device 20. Although any means to preserve a static snapshot can be used with the present invention, it is preferred that a particular process be used to preserve a static snapshot. The preferred method is summarized in the description of steps 70, 72, 74, decision block 84, and step 86 below. The method is more particularly described in U.S. Pat. No. 5,649,152 entitled METHOD AND SYSTEM FOR PROVIDING A STATIC SNAPSHOT OF DATA STORED ON A MASS STORAGE SYSTEM, previously incorporated by reference. In essence, a preferred method of preserving a static snapshot utilizes a snapshot storage, such as snapshot storage 22 of FIG. 3, to preserve data blocks of a mass storage device, such as mass storage device 20 of FIG. 3, that are to be overwritten with new data. As explained in greater detail below, the data blocks that are to be preserved are first copied into the snapshot storage and a record indicating that the data block has been preserved is updated. Such a record can be stored, for example, in snapshot map 52 of FIG. 3. New data may then be written to mass storage device 20 without losing the preserved data blocks.

When a snapshot is to be taken, as evaluated by decision block 66, the next step is to copy the snapshot map into the backup map as indicated by step 70 of FIG. 4. As previously described, a backup map, such as backup map 48 of FIG. 3, is used to indicate which data blocks have changed between a first instant in time and a second instant in time. These data blocks are then transferred to the backup system. As will become apparent in the description that follows, snapshot map 52 of FIG. 3 identifies those data blocks that have changed since a static snapshot was preserved at a particular instant in time. Thus, snapshot map 52 can be used as a backup map when a new snapshot is taken. Copying snapshot map 52 into a backup map 48 fulfills the desired function of identifying those data locations that have had new data stored therein between the time the last snapshot was taken and the current time. Obviously, it may not be necessary to copy the snapshot map to the backup map. The snapshot map may simply be used as the backup map and a new map taken as the current snapshot map.

After the snapshot map has been preserved so that it can be used as the backup map, the next step is to clear the current snapshot map. This step is indicated in FIG. 4 by step 72. The snapshot map is used to store an indication of those data blocks that have had new data stored therein since the snapshot was taken. Thus, the snapshot map indicates which data blocks are stored in a snapshot storage, such as snapshot storage 22 of FIG. 3. Since a new snapshot is to be taken, the snapshot map must be cleared.

After the snapshot map is cleared by step 72, the next step is to clear snapshot storage, such as snapshot storage 22 of FIG. 3. This is indicated by step 74 of FIG. 4. With particular regard to this step, it should be noted that it may not be necessary to physically erase or clear the snapshot storage. Generally, as with any other type of storage, it is usually sufficient to clear the index into the storage to indicate that the storage is empty. Thus, if the index is kept as part of the snapshot storage map, such as snapshot storage map 52 of FIG. 3, then clearing the snapshot storage map as performed in step 72 would be sufficient to indicate that the snapshot storage was empty. If, however, an index into the snapshot storage was kept separately from the snapshot storage map, then the index may need to be cleared separately by step 74. After the snapshot map and snapshot storage have been cleared, the system is ready to preserve a new snapshot. Execution therefore precedes back to the start as indicated by FIG. 4.

Attention is now directed to decision block 76 of FIG. 4. This decision block tests whether a message received by mass storage read/write processing block 42 is a mass storage read or write request. This block is included in FIG. 4 simply to emphasize the fact that mass storage read/write processing block 42 only processes read or write requests to the mass storage device and a snapshot request as previously described. Decision block 76 may not be necessary as part of mass storage read/write processing block 42 as long as the only messages sent thereto are mass storage read and/or write requests.

By the time decision block 78 is reached, the only messages that are possible are either a mass storage read request or mass storage write request. This is because other types of requests are either handled or filtered out before decision block 78 is reached. Decision block 78 distinguishes between a mass storage read request and a mass storage write request. If a request is a mass storage read request, then the next step is to retrieve the requested data block from mass storage device 20 and return the data to the process making the request. This is illustrated in step 80. If, however, the request is a write request, then execution proceeds to decision block 82.

Decision block 82 determines whether a snapshot is to be preserved. As previously described, in a preferred embodiment a snapshot is preserved by copying data blocks that are to be overwritten to a preservation memory such as snapshot storage 22 of FIG. 3. In this embodiment, the snapshot is in essence preserved incrementally. In other words, when the snapshot is preserved, the snapshot storage is prepared to preserve data blocks as previously described in steps 72 and 74. Thereafter, no data is stored in the snapshot storage until an actual write request occurs that will overwrite data that should be preserved. Thus, when a snapshot is preserved in this manner, it is important to determine if a snapshot has been taken or if write requests should occur to the mass storage system without worrying about preserving snapshot data. Decision block 82 tests whether the write request should occur without preserving snapshot data or whether snapshot data should be preserved for write requests. If the write requests should occur without preserving snapshot data, decision block 82 indicates that execution proceeds to step 88 where the data blocks are written to the mass storage device, such as mass storage device 20 of FIG. 3. It, however, snapshot data should be preserved, then execution proceeds to decision block 84.

As previously described, when a snapshot is taken according to a preferred embodiment, data which is to be overwritten is first copied to a snapshot storage, such as snapshot storage 22 of FIG. 3. After the data has been preserved in the snapshot storage, the new data block can be written to the mass storage system. The goal of a snapshot is to preserve the data as it exists on the mass storage system at a particular point in time. Thus, the snapshot need only preserve the data as it existed at the time of the snapshot. Decision block 84 tests whether the original data block stored on the mass storage system at the time that the snapshot was taken has previously been preserved in the snapshot storage. In other words, if the data currently stored at the designated write storage location is data that was stored at that location at the moment in time when the snapshot was taken, then if the write request occurred without first preserving the data, the original data would be lost. If, however, the original data stored therein at the time the snapshot was taken has previously been preserved in the snapshot storage, then the write request may occur and overwrite whatever data is stored at the designated location without worry since the original data has previously been preserved. If, therefore, decision block 84 determines that the original data has not yet been stored in the snapshot storage, then execution proceeds to step 86, which copies the original data into the snapshot storage. If, however, the original data has already been preserved, then step 86 is skipped.

After the original data has been preserved by step 86, or a determination was made that the original data had previously been preserved, then execution proceeds to step 88 where the write request is filled by writing the data block included with the write request to the designated storage location on the mass storage device.

Step 90 then identifies the storage location as containing new data. As previously described, this may be accomplished by placing an entry in a snapshot map, such snapshot map 52 of FIG. 3. Step 90 represents but one example of the previously described means for identifying storage locations of a mass storage device that have new data written therein.

A response may then be returned to the process making the write request. The sending of such a response is indicated in FIG. 4 by step 92. Such responses are typically sent to the process that issues the write request not only to indicate the success or failure of the write operation but also to indicate completion of the write operation. Execution then proceeds back to the start where the next request is handled.

Figure 5:
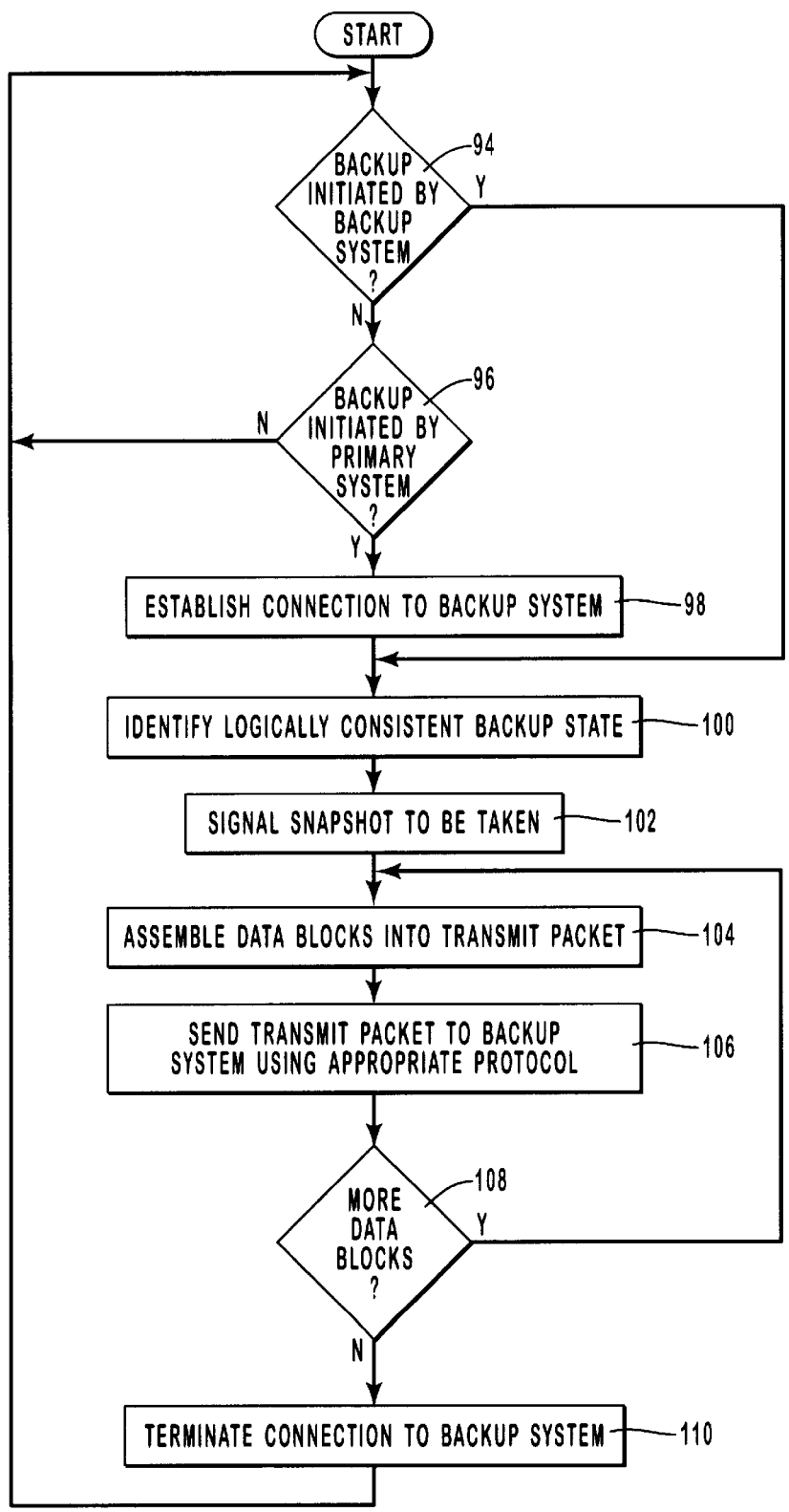
FIG. 5 illustrates the processing details of one embodiment of the primary backup processing block of FIG. 3.

Turning next to FIG. 5, the details of one embodiment implementing primary backup processing block 54 is presented. As previously described, primary backup processing block 54 is responsible for obtaining the data blocks that need to be transferred to the backup system and accomplishing the transfer using an appropriate communication protocol. As indicated in FIG. 5 by decision blocks 94 and 96, primary backup processing block 54 first determines whether a backup has been initiated by the backup system or whether a backup should be initiated by the primary system. Primary backup processing block 54 will do nothing until a backup is either initiated by the backup system or by the primary system.

The present invention can be used in a variety of modes. As previously explained, in one mode backups are initiated by the backup system. In such a system, the backup system may contact one or more primary systems and obtain the changes that have occurred since the last backup. Although such a mode can be used in a one-to-one situation, such a mode is extremely useful for what may be termed a many-to-one situation. In this mode, a centralized backup location may contact a plurality of primary systems located either locally or at remote sites and perform the backup for each contacted system in turn. In this mode, the backup system initiates the contact with one system, performs the backup, breaks the contact, and then initiates contact with the next system, and so forth. If simultaneous communication with multiple primary systems is available, the backup system may initiate contact with a number of primary systems at the same time. Using methods such as these, a company can backup critical data from anywhere in the world to a centralized location.

In another mode of operation, the backup is initiated by the primary system. In this mode of operation, the backup system waits for a primary system to establish contact and initiate a backup. The backup system then receives from the primary system the changes that have occurred since the last backup. In this mode, the backup system may also be acting to backup either a single primary system or a plurality of primary systems.

If the backup is initiated by the primary system as indicated in decision block 96, then the primary system establishes a connection to the backup system as indicated in step 98. This connection is established via backup transport link 16 of FIG. 3. As indicated previously, backup transport link 16 may be any type of communication link that allows data to be transferred between the primary system and the backup system. Thus, step 98 will establish the connection using a method appropriate to the type of communication link between the primary system and the backup system. For example, if a dial-up connection is to be established, the primary system will dial the phone number of the backup system and establish contact using the appropriate communication protocol. Other connections are established using other types of protocols.

After the communication link has been established by the primary system if the backup is initiated by the primary system, or if decision block 94 detects that a backup has been initiated by the backup system, then execution proceeds to step 100. Step 100 identifies a logically consistent backup state. As previously described, embodiments within the scope of this invention may comprise means for identifying a logically consistent state of a mass storage device. Step 100 illustrates but one example of such means. Identifying a logically consistent state of the mass storage device may be accomplished either through an API or by monitoring activity on the mass storage device. Any method or mechanism that allows such a logically consistent state to be identified can be employed by the present invention.

After a logically consistent state has been identified, then a snapshot of the logically consistent state is preserved so that the backup may proceed. The snapshot is preserved by step 102 which signals the snapshot processing, as for example snapshot processing block 50 incorporated into a mass storage read/write processing block 42 of FIG. 3, to take the snapshot. In one embodiment, this results in snapshot request 68 being sent to mass storage read/write processing block 42. As previously described, this request will cause steps 70, 72, and 74 of FIG. 4 to be executed, which prepares for the snapshot to be taken. Thereafter, original data stored in the mass storage device 20 at the time the snapshot was taken will be preserved by decision block 84 and step 86 of FIG. 4.

After the snapshot has been taken in order to preserve the logically consistent backup state identified by step 100 of FIG. 5, the next step in FIG. 5 is to assemble data blocks into a transmit packet as indicated by step 104. As previously explained, backup transport link 16 of FIG. 3 may be implemented using a wide variety of technologies. In fact, several technologies may be used to communicate between a single backup system and a single primary system. For example, the two systems may be connected by a preferred backup transport link such as the internet or a high-speed, wide area network connection. If, however, the preferred link is unavailable then the system may revert to slower links such as a lower-speed dial-up connection. Thus, when step 104 indicates that data blocks should be assembled into a transmit packet, the format of the transmit packet will be dependent upon the exact communication link being used to send data between the backup system and the primary system. In some embodiments, depending upon the data block size and the transmit packet size, several data blocks may be able to be packed into a single transmit packet. In other situations, a single data block may need to be broken into several different transmit packets. Step 104 should be construed to include any translation or formatting that must occur to assemble a transmit packet for transfer to the backup system.

After the transmit packet has been assembled, step 106 sends the transmit packet to the backup system using an appropriate transmit protocol. After the transmit packet has been received by the backup system, step 108 tests whether more data remains to be sent. If so, execution proceeds back to step 104 where another transmit packet is assembled and sent. If no more data remains to be sent, then the connection to the backup system is terminated by step 110 and execution proceeds back to the start where primary backup processing block 54 waits until the next backup is initiated. The backups may be initiated, either by the backup system or by the primary systems, on a periodic schedule. Thus, the present invention may be used to capture a series of backups, each representing a logically consistent backup state, from one or more primary systems.

Figure 6:
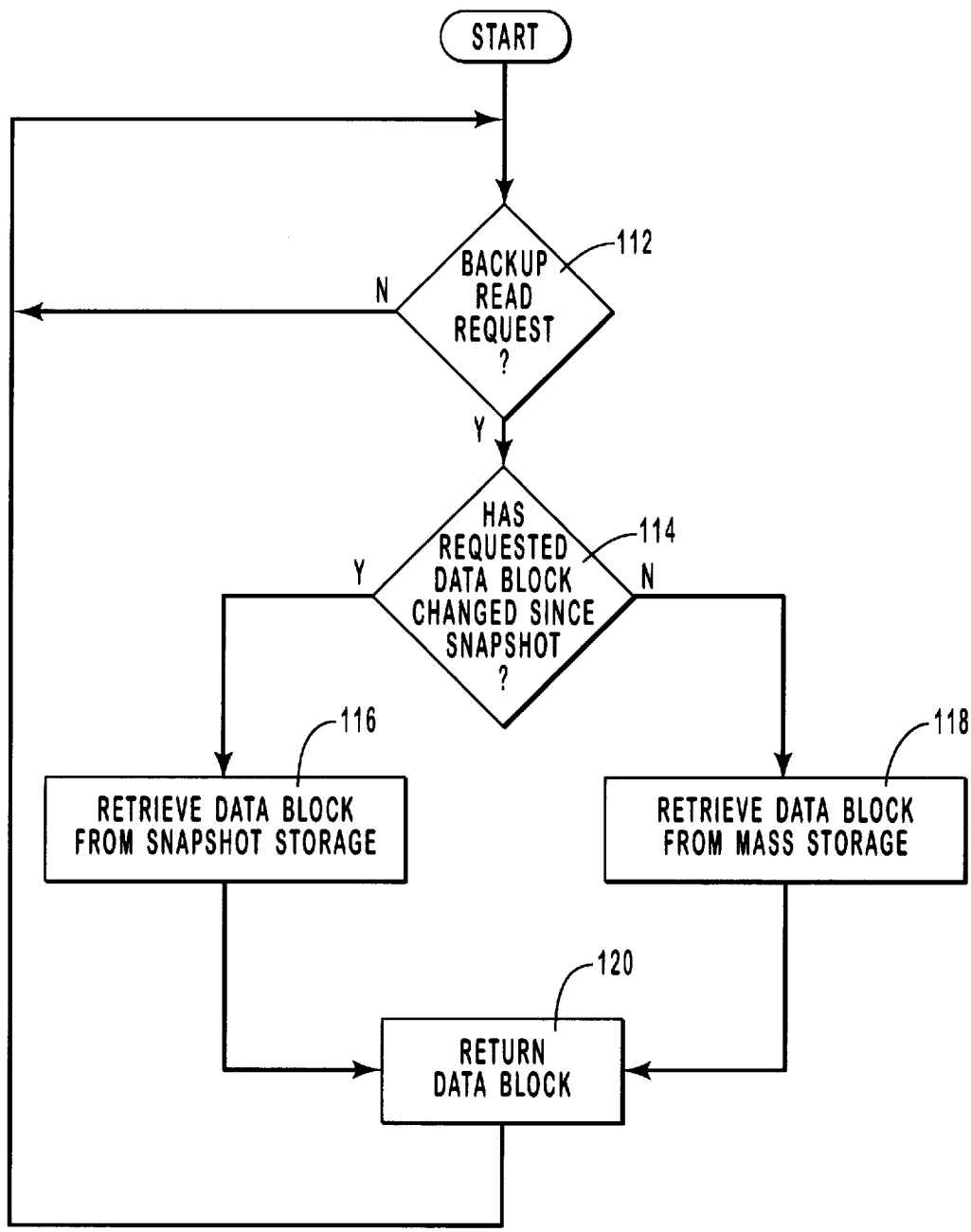
FIG. 6 illustrates the processing details of one embodiment of the backup read processing block of FIG. 3.

As previously described, the data blocks that are sent to the backup system by step 104 are only those data blocks that have changed since the last backup. Furthermore, the data blocks are transferred as they existed at the moment in time that the snapshot was taken. Thus, a backup map, such as backup map 48 of FIG. 3, identifies the data blocks that should be transferred and the snapshot preserves those data blocks in the state that they were in when the snapshot was taken. Primary backup block 54 will therefore need to retrieve certain data blocks that were preserved by the snapshot. Primary backup processing block 54 may incorporate the functionality needed to retrieve the data blocks from the snapshot and/or mass storage system, or such functionality may be incorporated into a separate processing block. A separate processing block incorporating this functionality is illustrated in FIG. 3 by backup read processing block 56. FIG. 6 presents one embodiment of backup read processing block 56 designed to recover the data preserved by these snapshots.

In FIG. 6, decision block 112 highlights the fact that backup read processing block 56 only handles read requests that are to retrieve the data as it existed at the moment in time when the snapshot was taken. This decision block may not be necessary if the structure and architecture of the processing guarantees that only such read requests are sent to backup read processing block 56 of FIG. 3.

In order to retrieve a data block as it existed at the moment in time when the snapshot was taken, it must be determined where the data block resides. As previously described in conjunction with FIG. 4, after a snapshot is taken, the first time that a data block is to be overwritten by a new data block, the data block is copied into a snapshot storage, such as snapshot storage 22 of FIG. 3. This means that if a data block is never overwritten, then the data stored on the mass storage device is the original data as it existed when the snapshot was taken. If, however, the data has been overwritten one or more times, then the original data will be stored in the snapshot storage. Decision block 114 of FIG. 6 determines whether the requested data block has been changed since the snapshot was taken. This may be accomplished by checking a snapshot map, such as snapshot map 52 of FIG. 3, in order to determine whether the data block has been modified. As previously described, the snapshot map identifies those storage locations that have changed since the snapshot was taken.

If the storage location has had new data stored therein since the snapshot was taken, then step 116 indicates that the data block is retrieved from snapshot storage. If, however, the content of a storage location has not changed since the snapshot was taken, then step 118 indicates that the data block is retrieved from mass storage device 20. In either case, the data block is returned to the requesting process by step 120.

Figure 7A:
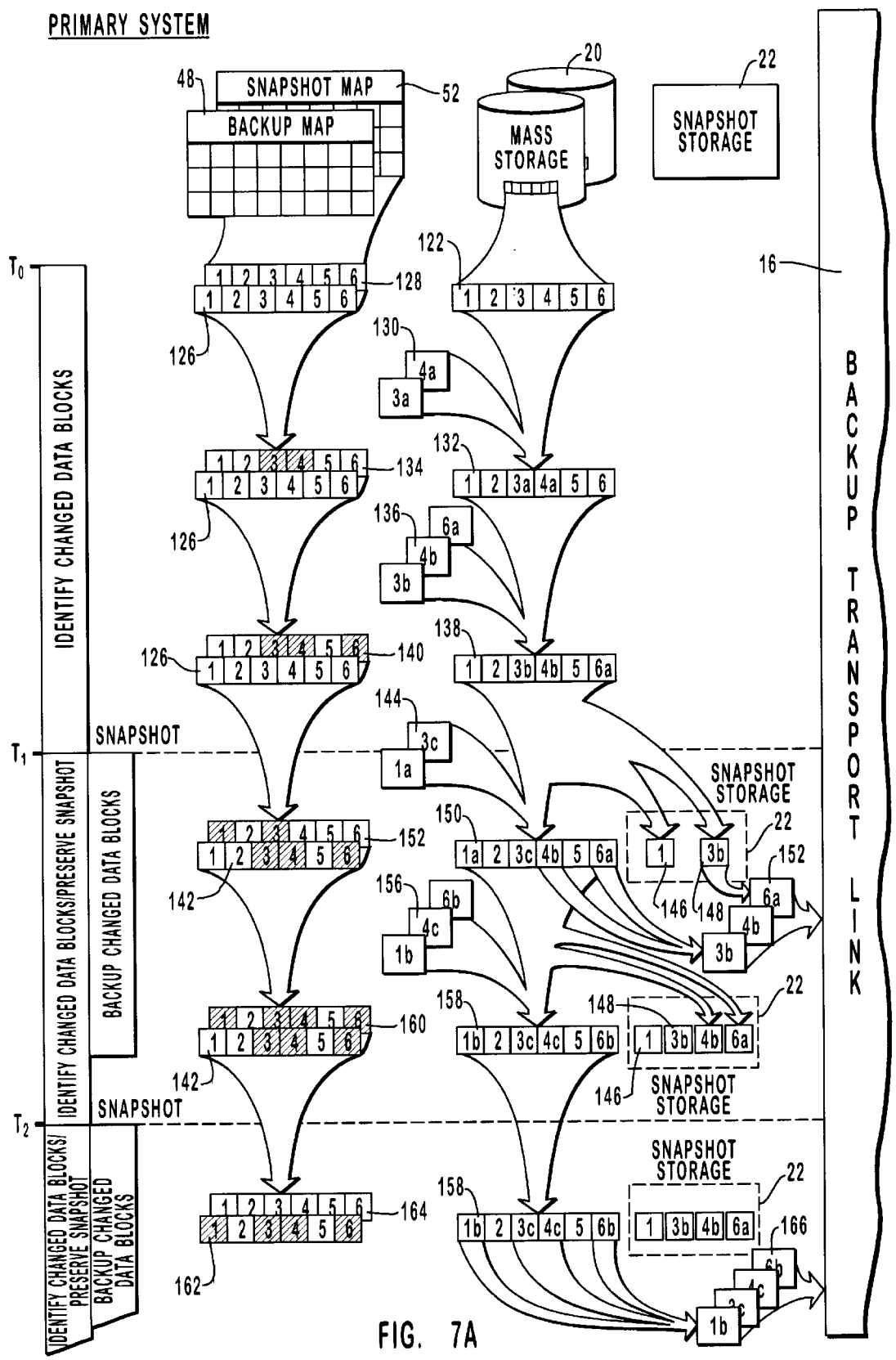
FIGS. 7A and 7B are diagrams illustrating an example of a method of the present invention.
Figure 7B:
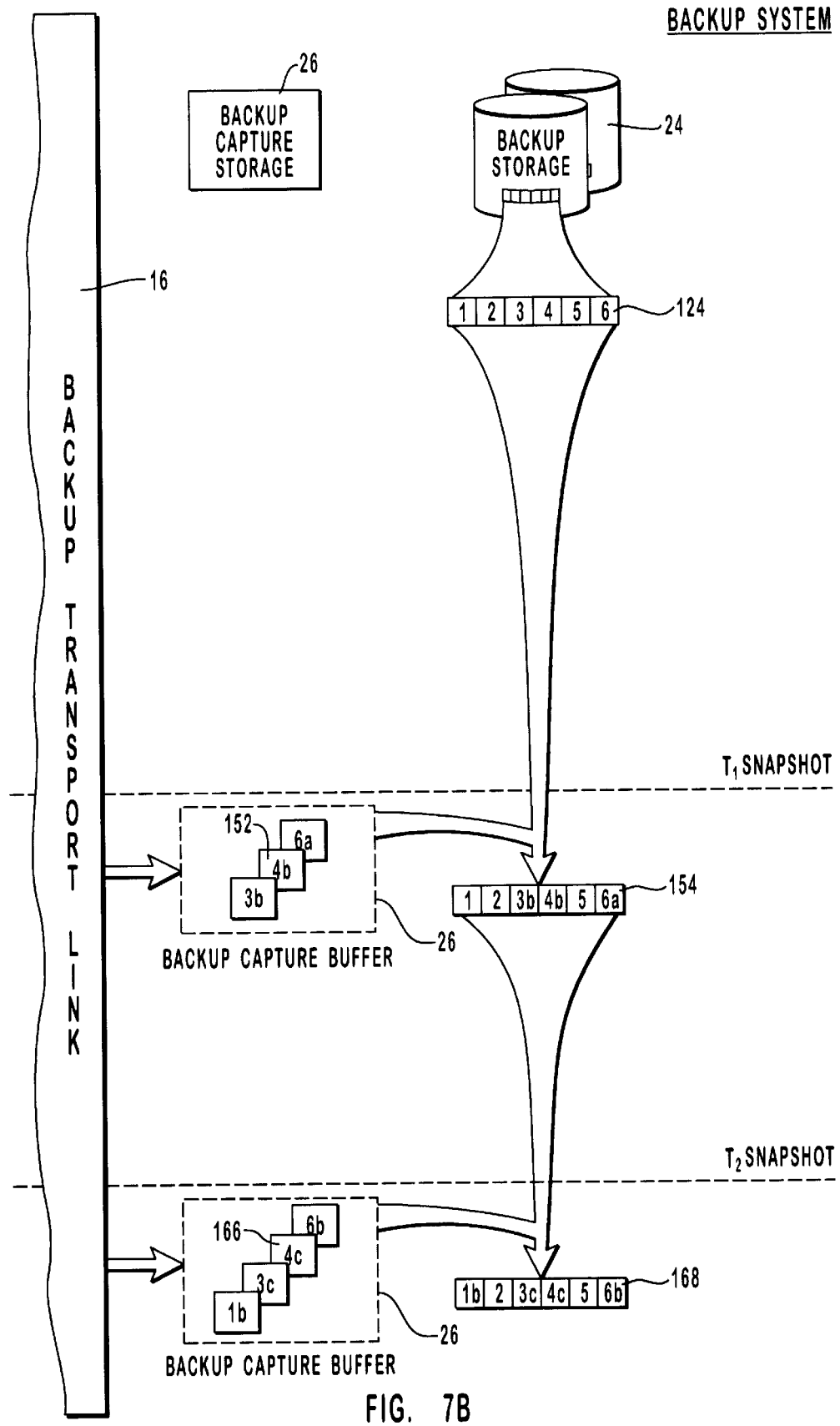

In order to illustrate in greater detail the operation of FIGS. 3–6 in creating a backup, a detailed example is presented in FIGS. 7A and 7B. Referring first to FIG. 7A, consider a group of data blocks 122, stored in storage locations numbered 1–6, of mass storage device 20. FIG. 7B shows that backup storage device 24 also has a similar group of data blocks 124, also stored in storage locations numbered 1–6. At time $T_0$, the data blocks stored in 122 are identical to the data blocks stored in 124. Referring again to FIG. 7A, backup map 48 has six map locations 126 that correspond to storage locations 122. Snapshot map 52 also has six map locations 128 that correspond to storage locations 122. As illustrated in FIG. 7A, at time To map location 126 and 128 are cleared.

Assume that after time $T_0$, data blocks 130 are to be stored in locations 3 and 4 of storage locations 122. One or more mass storage write requests will then be presented to mass storage read/write processing block 42 of FIG. 3 in order to have data blocks 130 written to the appropriate storage locations. Turning to FIG. 4, the mass storage write request would be processed in the following manner.

Decision blocks 66, 76, and 78 would combine to determine that a write request is being presented to mass storage read/write processing block 42. Execution would thus pass through these three decision blocks to decision block 82. As described previously, decision block 82 tests whether a snapshot has been taken. At this point in the example, no snapshot has been taken. Execution would thus proceed to step 88 which would write the requested data blocks into the mass storage system. Returning to FIG. 7A, data blocks 130 would thus be stored in storage locations 122 to produce storage locations 132. As indicated, therein, the data blocks stored in locations 3 and 4 have been modified to 3*a* and 4*a*.

Returning to FIG. 4, step 90 next indicates that the storage locations where new data has been stored should be indicated as modified. In many snapshot embodiments, a snapshot map can be used for this purpose. In FIG. 7A, map 134 is used and map locations 3 and 4 have been grayed to indicate that data has been stored in storage locations 3 and 4. Note that the storage locations in backup map 48, as indicated by map locations 126 remain unchanged at this point. Returning to FIG. 4, a write request response would be returned by step 92 and execution would proceed back to the start to await the next request.

Returning now to FIG. 7A, suppose that the next request contained three data blocks 136 that were to be stored in locations 3, 4, and 6. Since a snapshot has not yet been taken, this request will be handled in the same way as the previous write request with execution proceeding through decision blocks 66, 76, 78, and 82 of FIG. 4 to step 88 of FIG. 4. Step 88 indicates that the new data is stored in the mass storage device so that storage locations 138 of FIG. 7A now indicate that the data blocks stored in location 3 has been changed to 3*b*, the data block stored in location 4 has been changed to 4*b*, and the data block stored in location 6 has been changed to 6*a*. As with the previous write request, map locations 140 are then updated to indicate that in addition to locations 3 and 4, location 6 has also been changed. Map locations 126 remain unchanged.

Assume at this point in our example that the backup system or the primary system initiates a backup. Primary backup processing block 54 of FIG. 3 will then begin executing as described in FIG. 5. In FIG. 5, if the backup was initiated by the backup system, execution would proceed from decision block 94 to step 100. If, however, the backup was initiated by the primary system, then execution would proceed from decision block 96 to step 98 where a connection would be established to the backup system. In any event, execution would proceed to step 100. In step 100, primary backup processing block 54 would identify a logically consistent backup state. As previously explained, this may be accomplished in any way such as, for example, watching the activity on mass storage device 20 or through an API.

After identifying a logically consistent backup state, step 102 indicates that the signal to take a snapshot is sent. As previously described, rather than signalling a snapshot to be taken, the means to preserve a static snapshot may be incorporated directly into step 102. In the embodiment illustrated in FIG. 3, and described in greater detail in FIGS. 4–6, step 102 would send snapshot request 68 of FIG. 3 to mass storage read/write processing block 42.

Turning now to FIG. 4, this snapshot request will be processed by decision block 66 which will result in steps 70, 72, and 74 being executed. In step 70, the snapshot map is copied to the backup map. In FIG. 7A, this means that map locations 140 are copied into map locations 142 of backup map 48. Thus, map locations 142 indicate that locations 3, 4, and 6 have had new data stored therein. Returning now to FIG. 4, step 72 clears the snapshot map and step 74 clears the snapshot storage as previously described. Execution in FIG. 4 would then return to the start to await further processing.

Assume at this point, that a write request arrived at mass storage read/write processing block 42 requesting that data blocks 144 of FIG. 7A be stored in storage locations 138. Because this is a write request, execution will proceed through decision blocks 66, 76, and 78 to decision block 82. Unlike previous write requests, a snapshot has now been taken at time $T_1$ as indicated in FIGS. 7A and 7B. Thus, execution will proceed to decision block 84.

Decision block 84 determines whether the data stored in the storage locations that are to be overwritten have been previously stored in snapshot storage. In this example, data blocks 144 are to be stored in storage locations 1 and 3. Since storage locations 1 and 3 have not yet been placed in snapshot storage, step 86 will copy storage locations 1 and 3 into snapshot storage. In FIG. 7A, this is illustrated by data block 146 containing data block 1 and data block 148 containing data block 3*b*.

After data block 146 and 148 have been preserved in snapshot storage 22, the new data blocks are written to the mass storage device by step 88. Returning to FIG. 7A, this means that data blocks 144 are stored in storage locations 138 in order to produce storage locations 150 where data block 1*a* has overwritten data block 1 and data block 3*c* has overwritten data block 3*b*. Step 90 of FIG. 4 then states that the data blocks need to be identified as modified. Thus, map locations 152 of snapshot map 52 are modified to indicate that storage location 1 and storage location 3 have new data stored therein. A write request response is then returned as directed by step 92 of FIG. 4.

Returning now to FIG. 5, the snapshot was taken at time $T_1$ by mass storage read/write processing block 42 of FIG. 3 as directed by step 102 of FIG. 5. Step 104, step 106, and decision block 108 then indicate that the data blocks that were changed before the snapshot was taken should then be assembled into transmit packets and sent to the backup system. The data blocks that should be transferred are indicated by the information contained in backup map 48.

Returning to FIG. 7A, map locations 142 of backup map 48 indicate that storage locations 3, 4, and 6 have been changed prior to the snapshot taken at time $T_1$ and should be sent to the backup system. An examination of storage locations 150 and data block 148 stored in snapshot storage 22 indicates that one of the data blocks is in the snapshot storage while the remainder of the data block are on the mass storage system. Step 104 of FIG. 5 would then request that data blocks stored in storage locations 3, 4, and 6 be retrieved by backup read processing block 56 of FIG. 3.

Backup read processing block 56 will process these requests received from primary backup processing block 54 as illustrated in FIG. 6. The request will be for the data blocks stored in storage locations 3, 4, and 6. With regard to the data block stored in storage location 3, decision block 114 of FIG. 6 will identify that the decision block stored in storage location 3 has changed since the snapshot was taken. This is because the data block labeled 3*c* was stored in storage location 3 after the snapshot was taken, but before the data block was retrieved for the backup. Step 116 will then retrieve data block 148 from snapshot storage 22 and return data block 3*b* to primary backup processing block 54 as illustrated in step 120 of FIG. 6.

Decision block 114 of FIG. 6 will then retrieve the data block stored in storage locations 4 and 6 from the mass storage device in step 118 and return them to primary backup processing block 54 in step 120. This process is illustrated graphically in FIG. 7A where data blocks 152 are assembled by retrieving data block 3*b* from snapshot storage 22 and data block 4*b* and 6*a* from storage locations 150. Data blocks 152 are then transferred to the backup system, via backup transport link 16. This is graphically illustrated in FIGS. 7A and 7B.

As described in greater detail below, when data blocks are received by a backup system it may be desirable to store the data blocks as they are received in a backup capture buffer, such as backup capture buffer 26 of FIG. 3. This allows all data blocks to be received before they are applied to backup storage device 24 or before they are saved as an incremental backup. In FIG. 7B, data blocks 152 are received by the backup system and applied to storage locations 124 to achieve storage locations 154. Storage locations 154 are identical to storage locations 138 of the primary system (FIG. 7A). Recall that storage locations 138 represented the state of mass storage device 20 at time $T_1$ when the snapshot was taken. Thus, the changes that have occurred between time $T_0$ and time $T_1$ have now been backed up to the backup system and applied to backup storage device 24 in order to bring backup storage device 24 current with mass storage device 20 at time $T_1$.

Returning now to FIG. 7A, suppose that data blocks 156 are now to be written to storage locations 150. As illustrated therein, data blocks 156 comprise a change to the data blocks stored in storage locations 1, 4, and 6. Mass storage read/write processing block 42 will handle the write of the data blocks to be stored in locations 4 and 6 as previously described with the original data blocks stored in those locations at time $T_1$ (data block 4b and data block 6a) being stored in snapshot storage 22. New data blocks 4c and 6b will then be written to mass storage device 20.

With regard to the data block that is to be stored in storage location 1, execution will proceed in FIG. 4 down to decision block 84. Recall this decision block tests whether the data block stored in the storage location at the time that the snapshot was taken has previously been preserved in the snapshot storage. With regard to the data block stored in storage location 1, the data block has been previously preserved in snapshot storage 22 as indicated by data block 146 of FIG. 7A. Thus, FIG. 4 indicates that step 86 is skipped and the new data is simply written to the mass storage device. In FIG. 7A, this results in data block 1b replacing data block 1a so that data block 1a is lost.

Recall that the present invention only transfers the data blocks of those storage locations that have changed since the last backup. Furthermore, the data blocks are transferred as they exist at the time that the snapshot is made. Thus, if a particular storage location on the mass storage device has five different data blocks stored therein during the time since the last backup, only the data block stored last (e.g. just before the snapshot is taken) is transferred to the backup system. This is because the backup system only preserves a logically consistent backup when the backup is taken. In other words, the backup storage moves from a logically consistent state at one moment in time to a logically consistent state at another moment in time. Preserving logically consistent backups at discrete moments in time provides significant advantages over prior art systems.

For example, consider a prior art system that captures each and every change made to a mass storage system. Such a prior art system will attempt to send every write operation both to the mass storage device and to the backup storage device. In theory, this makes the backup storage device an identical copy of the mass storage device. However, problems arise with this approach. If the primary system crashes during a write update, it may leave the mass storage device in a logically inconsistent state. If the backup storage device is tracking every change made to the mass storage device, then when the primary system crashes, the backup storage device may also be left in the same logically inconsistent state. This example highlights the problem of leaving a known logically consistent state before a second logically consistent state has been identified. The present invention avoids this problem by maintaining the prior logically consistent state until a new logically consistent state has been identified and then moves the backup storage device from the previous logically consistent state to the next logically consistent state without transitioning through any logically inconsistent states between the two logically consistent states.

Returning to FIG. 7A, when data blocks 156 are applied to storage locations 150, storage locations 158 result. Map locations 152 are then updated to indicate that the storage locations that have been changed since time $T_1$ now include storage locations 4 and 6 in addition to storage locations 1 and 3. This is illustrated in FIG. 7A by map locations 160 of snapshot storage 152.

Assume that a second backup is now to be made of mass storage device 20. The backup will be made as previously described in FIG. 5, when execution proceeds to step 100 where a logically consistent state is identified. In FIG. 7A, assume this logically consistent state was identified at time $T_2$. Step 102 of FIG. 5 would then signal a snapshot to be taken at time $T_2$. As previously described in conjunction with the snapshot taken at time $T_1$, mass storage read/write processing block 42 would receive a snapshot request, such as snapshot request 68 of FIG. 3, and will copy the snapshot map to the backup map in step 70. This is indicated in FIG. 7A where map locations 162 of backup map 48 are changed to be the same as map locations 160 of snapshot map 52.

Steps 72 and 74 of FIG. 4 then indicates that the snapshot map and snapshot storage should be cleared. In FIG. 7A, the snapshot map is cleared as indicated by map locations 164 of snapshot map 52. Snapshot storage 22, however, still shows data blocks stored therein. This is to illustrate that the data blocks may still physically reside in snapshot storage 22 as long as the index to snapshot storage 22 is cleared so that snapshot storage 22 appears to contain no data blocks.

Assuming that no data blocks are within storage locations 158 after the snapshot taken at time $T_2$, then data blocks 166 will be read from storage locations 158 according to the process described in FIG. 6. The data blocks will then be packaged into transmit the packets and sent to the backup system via backup transport link 16 as illustrated in step 104, step 106, and decision block 108 of FIG. 5. As illustrated in FIG. 7B, data blocks 166 will then be stored in backup snapshot buffer 26 until all data blocks are received. After data blocks 166 have been received by the backup system, then are applied to storage locations 154 in order to arrive at storage locations 168, which are an identical copy of storage locations 158 of the primary system (FIG. 7A).

The mechanism to discover differences between mass storage device 20 and backup storage device 24 is described next. Embodiments within the present invention may comprise means for identifying differences between a mass storage device and a backup storage device. Such means may be very useful in recovering from crashes that happen on the primary or backup system. For example, it is apparent from the previous example and above descriptions that the present invention tracks changes made to the mass storage device between a first instant in time, such as the time that the last backup was made, to a second instant in time, such as the time that a current backup is to be made. If a backup is to be made at the second instant in time, the primary system then preserves a snapshot of at least the storage locations that have had new data written therein the data blocks are then retrieved and transferred to the backup system. During the transfer process, the system also tracks changes that are made so that when another backup is to be made, all the changes from the last backup to the current backup can be identified.

The above described process works very well as long as there is not an interruption in tracking changes that are made to the mass storage device. If, however, a situation arises where the primary system cannot identify which changes have been made to the mass storage system since the last backup, then a mechanism must be in place for identifying differences between the mass storage device and the backup storage device. By identifying differences between the mass storage device and the backup storage device, these storage locations that are different can be identified. The data stored in those storage locations can then be transferred from the primary system to the backup system in order to bring the backup system current with the primary system.

One mechanism to identify differences between a mass storage device and a backup storage device is to compare each and every data block on the mass storage device and the backup storage device. This requires transferring either the data blocks of the mass storage device to the backup system or transferring the data blocks of the backup storage device to the primary system. In certain circumstances this may be entirely adequate. However, this method requires a fairly large bandwidth for backup transport link 16. If, however, backup transport link 16 is a relatively low bandwidth communication link, then transporting each and every data block of either the mass storage device or the backup storage device across backup transport link 16 becomes impractical. In such a situation, a mechanism must be in place to reduce the amount of data that is transferred across backup transport link 16.

In order to reduce the amount of data needed to identify differences between a mass storage device and a backup storage device, embodiments within the scope of this invention may comprise means for calculating a digest from a data block. As used herein, a "digest" is a group of data bits that is generated from a data block and the reflects the data block. If the digest is smaller than a data block and if the digest reflects the data of a data block, then differences between a mass storage device and a backup storage can be identified by comparing digests. Such a method is illustrated in FIG. 8.

Figure 8:
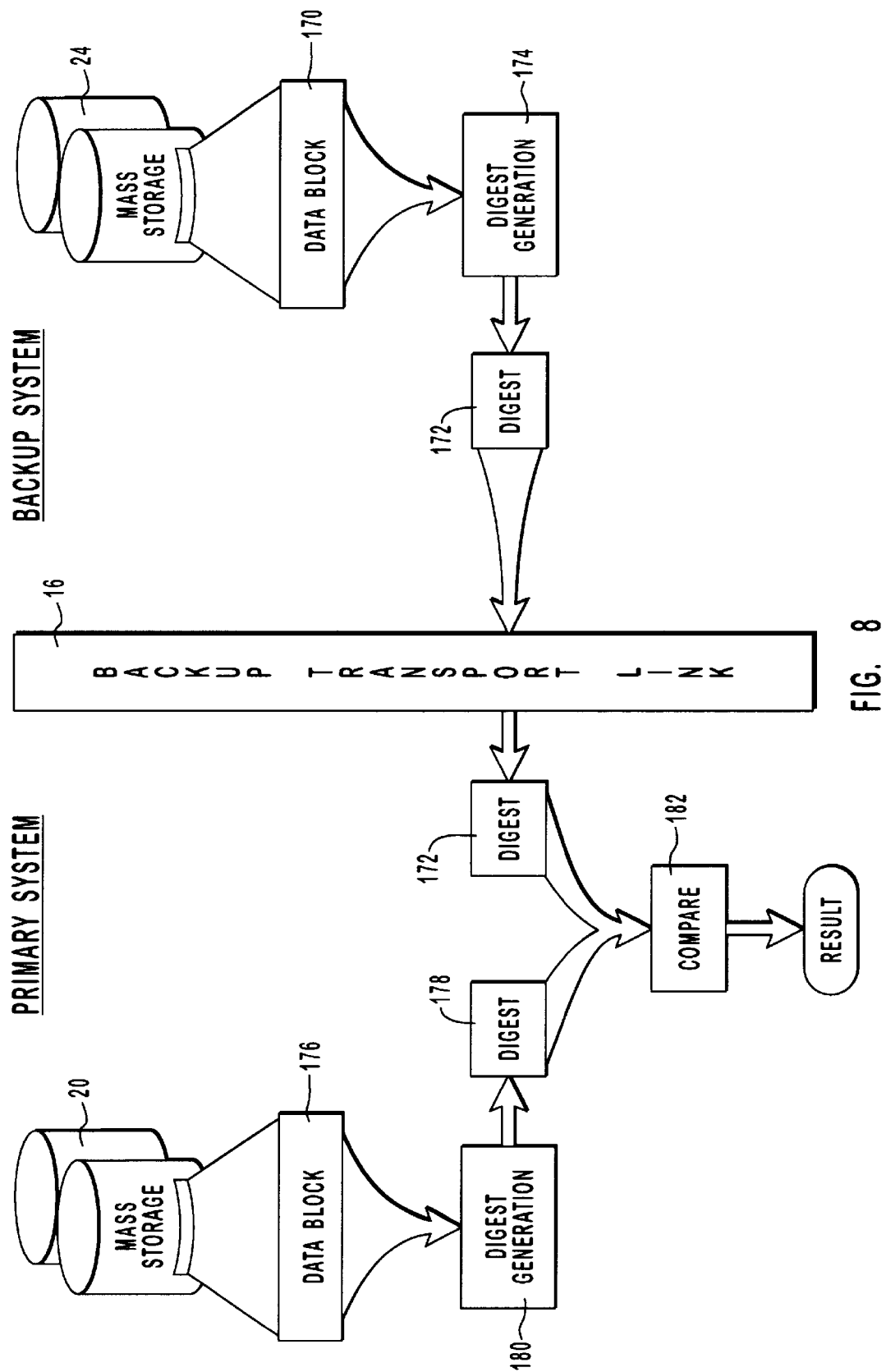
FIG. 8 illustrates a method of identifying differences between a mass storage system and backup storage system.

In FIG. 8, the method to identify differences between a mass storage device, as for example mass storage device 20, and a backup storage device, as for example backup storage device 24, proceeds as follows. The backup system retrieves a data block, such as data block 170 from backup storage device 24. Digest 172 is then calculated by means for generating a digest, as for example digest generation block 174. Digest 172 is transported across backup transport link 16 and received by the primary system. The primary system retrieves a data block stored in the corresponding storage location of mass storage 20, as for example data block 176. Digest 178 is generated by digest generation means, as for example digest generation block 180. Digest 178 is then compared to received digest 172 by compare block 182. If the digests match, then the data blocks stored in the corresponding storage locations can be assumed to be identical. If the digests do not match, then the data blocks stored in the corresponding storage locations are different. A similar mechanism can be used to detect differences in groups of data blocks. For example, a digest can be calculated on a plurality of concatenated data blocks. Differences in the digests would then identify differences in groups of data blocks.

From the above description of FIG. 8, several desirable properties of the digest can be identified. Ideally, a digest would be small in length to minimize the amount of data that needs to be transferred between the primary system and the backup system. Second, the probability of two different data blocks generating the same digest should be small so that the probability of identifying two different data blocks to be the same when they are actually different is small. Finally, it would be desirable, although not required, to reduce the computation burden needed to calculate the digest so that the process of comparing the mass storage device to the backup storage device is limited not by the computations performed by the primary system or the backup system but, rather, by the bandwidth of backup transport link 16.

A wide variety of functions can be used to calculate an appropriate digest. The simplest, and perhaps most well known form of digest, is a cyclic redundancy check or CRC. CRC values are typically used to detect errors in a block of data transmitted across a communication link or stored on a storage device. Cryptographically strong hash functions (also referred to as digests, fingerprints, or message authentication codes) have also been developed to perform a similar function. Any method can be used as long as the digest has a sufficiently high probability of detecting differences between two data blocks.

Figure 9:
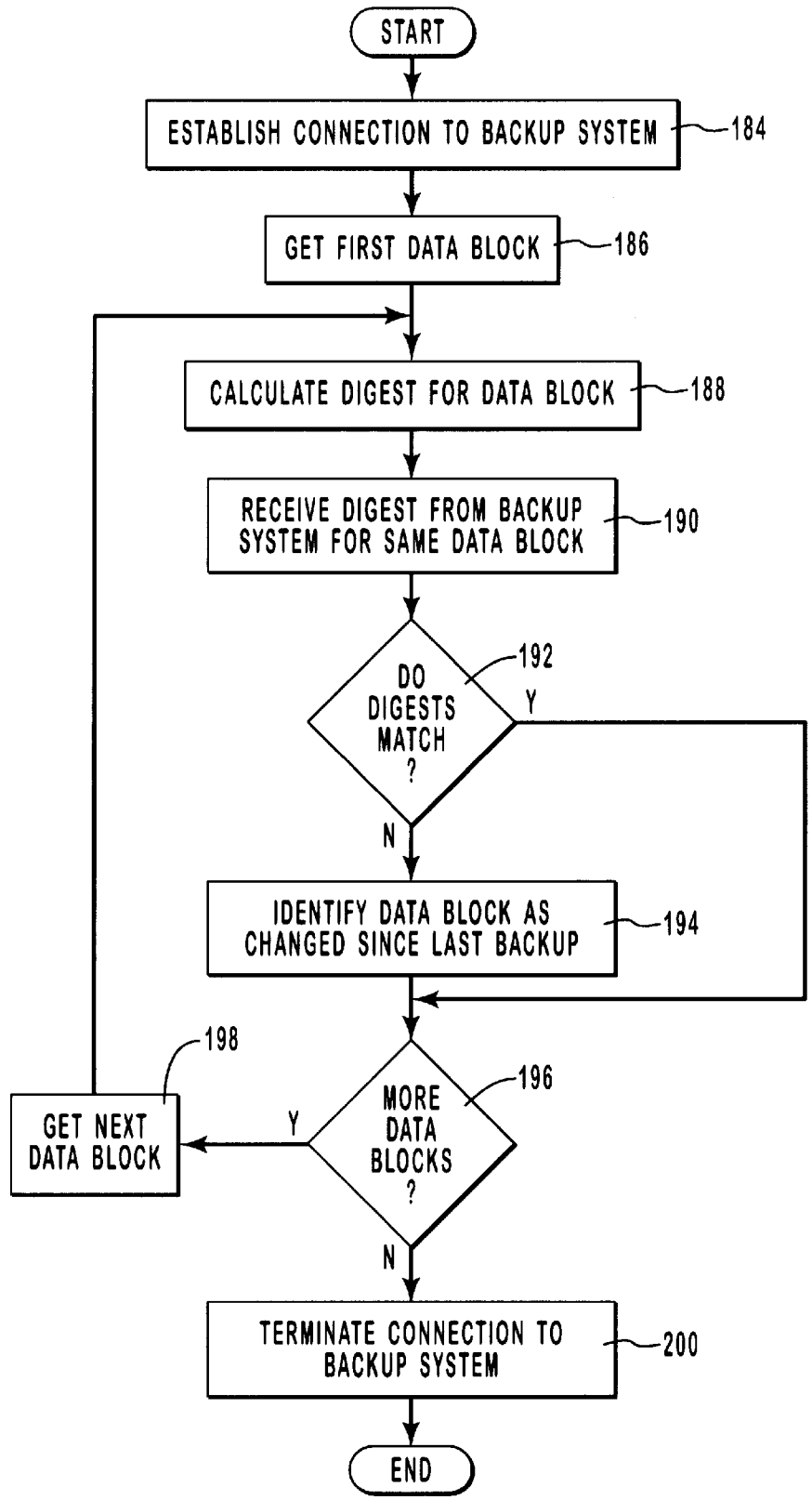
FIG. 9 illustrates the processing details of one embodiment of the difference identification processing block of FIG. 3.

As previously described, difference identification processing block 58 of FIG. 3 is used to identify differences between mass storage device 20 and backup storage device 24. Turning now to FIG. 9, the details of one embodiment implementing difference identification processing block 58 are presented. In this embodiment, it is presumed that the digests are transferred from the backup system to the primary system and the primary system compares the digests to determine if they match.

As illustrated by step 184 of FIG. 9, the first step is to establish a connection to the backup system. The first data block of mass storage device 20, or the first data block of the portion of mass storage device 20 that is to be checked, is then retrieved by step 186. The digest is then calculated for the data block by step 188.

In step 190, the digest calculated by the backup system on the data stored in the corresponding storage location is received. The digests are then compared by decision block 192. If the digests do not match, then it may be presumed that the data blocks do not match and the data block on mass storage device 20 can be presume d to have changed since the backup captured by backup storage device 24. This data block of mass storage device 20 is then identified in step 194 as changed since the last backup. Returning now to FIG. 3, if the difference identification block 58 is used to rebuild snapshot map 52 after a crash, then difference identification block 58 can store the results of the compare in snapshot map 52 or backup map 48.

If more data blocks exist to be compared, decision block 196 and step 198 retrieve the next data block and return execution to step 188 where the digest is calculated on the next data block. If no more data blocks need to be compared, step 200 terminates the connection to the backup system and the compare process is complete.

It is apparent that if the digest is much smaller than a data block or a group of data blocks, then the amount of data that needs to be transferred between the primary system and the backup system in order to identify differences between the mass storage device and the backup storage device can be greatly minimized. For example, if a data block is 512 bytes long and a digest is two bytes long, then the data transferred can be reduced by a factor of 256. This can result in a significant time savings. It also makes it feasible to compare a backup storage device located at a remote site to a mass storage device using only a relatively low bandwidth dial-up communication link.

Figure 10:
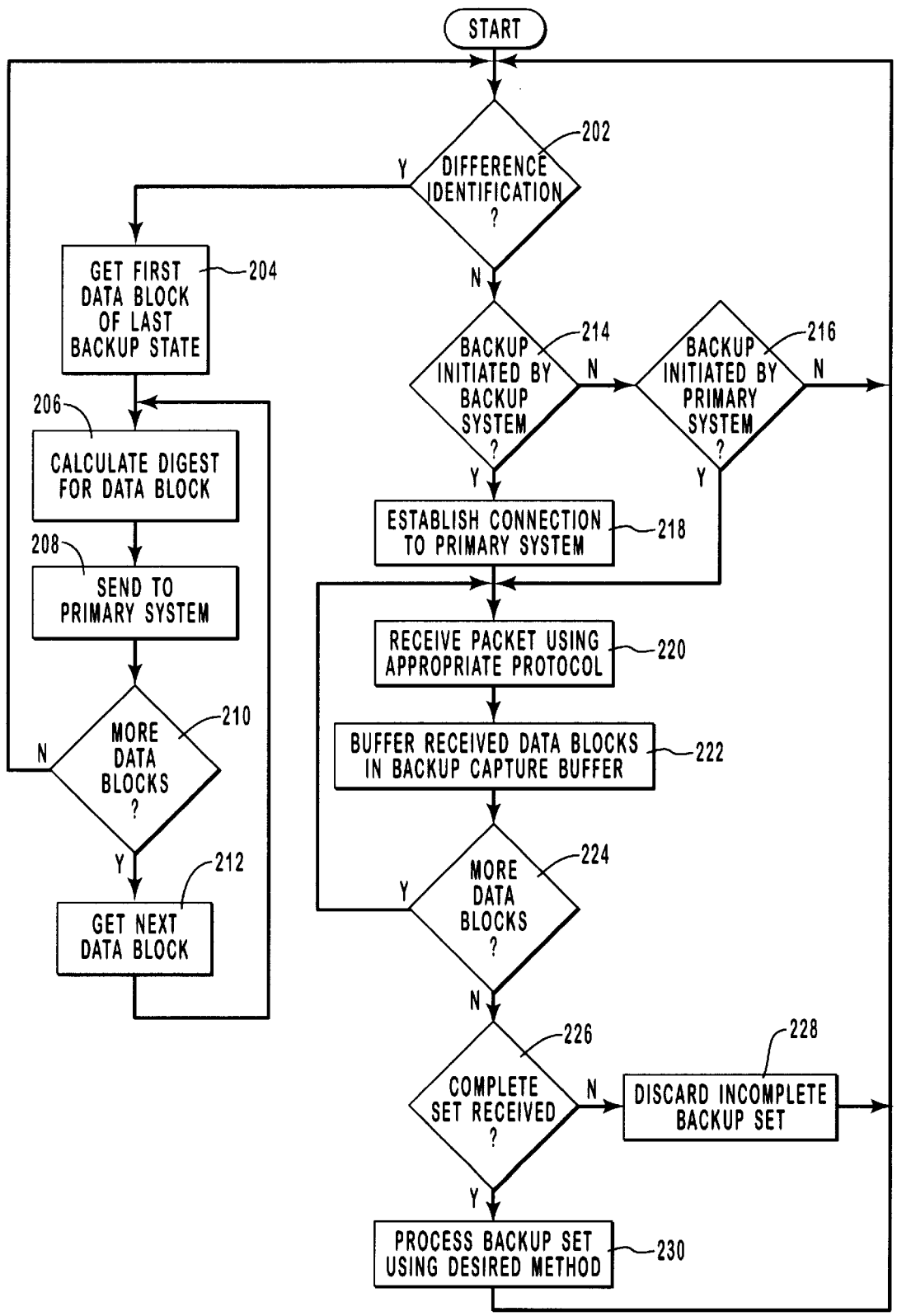
FIG. 10 illustrates the processing details of one embodiment of backup system processing block of FIG. 3.

Turning now to FIG. 10, the processing of one embodiment of backup system processing block 60 of FIG. 3 is presented. This is the processing that occurs on the backup system. The processing illustrated in FIG. 10 is straightforward given the previous discussion and represents the complimentary processing to primary backup processing block 54 and difference identification processing block 58.

Decision block 202 of FIG. 10 identifies whether difference identification processing block 58 is attempting to compare the differences between mass storage device 20 and backup storage device 24. If the differences are to be identified, then execution proceeds to step 204 where the first data block of the last known backup state is retrieved. Step 206 then calculates the digest for this data block and step 208 transfers the digest to the primary system. This digest is received by difference identification processing block 58 at step 190 of FIG. 9. Decision block 210 in step 212 then tests whether more data blocks exist and if so, retrieves the next data block and then returns processing to step 206 so that the digest for that data block can be calculated. When all data blocks have been processed, execution returns back to the start.

Decisions blocks 214 and 216 of FIG. 10 identify whether a backup is being initiated by either the backup system or by the primary system. The decision blocks are analogous to decision blocks 94 and 96 of FIG. 5. If the backup is to be initiated by the backup system, then a connection is established to the primary system by step 218. If the backup is initiated by the primary system, then the connection will have previously been established and execution can proceed directly to step 220.

Step 220 receives a packet from the primary system using the appropriate protocol. This packet would be transferred to the backup system by step 106 of FIG. 5. The packet will contain one or more data blocks or portions thereof, depending on the size of the data block with respect to the size and format of a packet. Step 222 then buffers the received data blocks in a backup capture means such as backup capture buffer 26.

Buffering received data until all data blocks have been received is an important step in the present invention. As emphasized throughout this application, the present invention transfers the data blocks stored only in those storage locations that have had new data stored therein since the last backup. Furthermore, the data transferred is the data that is stored in those locations at the time that the snapshot is made. Thus, the time sequence of changes is not transferred and only the ultimate result of all the time sequence of changes since the last backup is transferred. This means that applying only a portion of the data blocks that are to be transferred may result in a logically inconsistent backup. It is, therefore, undesirable to apply only a portion of the data blocks that are to be transferred between the primary system and the backup system for a single backup. If the data blocks are applied to the backup storage device as they are received, and if the backup system or primary system crashes during the transfer, then the backup storage device may be left in a logically inconsistent state. For these reasons, it is presently preferred that the received data blocks be buffered in a temporary location until all data blocks are received. The data blocks may then be applied to the backup storage device or may be saved as an incremental backup all at once.

Decision block 224 ensures that all data blocks have been received. Once all data blocks have been received, decision block 226 tests whether a complete set has been received. This complete set comprises all the changes that have occurred since the last backup. If a complete set has not been received, then appropriate actions should be taken. For example, step 228 illustrates that the backup set should be discarded and not applied to the mass storage device. This is important for the reasons previously discussed. However, before a backup set is discarded additional efforts to recover any changes that are missing from the set may be undertaken. For example, the backup system can initiate contact with the primary system and request transfer of the missing changes. If the primary system is currently unavailable, then perhaps the partial set may be stored separately until contact with the primary system can be re-established. At that point, the backup system can inform the primary system which changes have been received and which changes remain to be transferred. Such attempts at recovery of missing changes may reduce the amount of data that needs to be retransferred between the primary system and the backup system. If, however, the changes cannot be recovered, then the entire set should be discarded and a new set received from the primary system.

If a complete set of changes have been received, then step 230 indicates that the changes should be processed using the desired method. Throughout this description, reference has been made to applying a group of changes to the backup storage device in order to bring the state of the backup storage device current to a particular point in time. In addition to applying the changes in this manner, the changes may also be saved as an incremental backup. By saving the changes as an incremental backup, several past backup states may be stored. This way, should data need to be recovered from the backup system, several backup states are available to choose from. Combinations of the above may also be used. For example, several incremental backups may be kept at which time the incremental backups are applied to an initial state in order to bring the backup device current to a particular point in time.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a computer system comprising a primary system having a mass storage system that stores data blocks in a plurality of storage locations each having a unique address, and a preservation memory means for providing a snapshot storage location, and wherein said computer system further comprises a backup system having a backup storage location, a method of backing up data blocks that are changed during a first time period that runs from a first instant in time to a second instant in time while reducing the amount of data that must be sent to the backup system, the method comprising the steps of:

identifying during a first time period that runs from a first instant in time to a second instant in time, only those storage locations of said mass storage system that have changed by virtue of new data stored in them during said first time period;

during a second time period that runs from the second instant in time to a third instant in time, when a data block that was stored at said second instant in time in any of said identified storage locations is to be changed, preserving in said preservation memory means a snapshot of the unchanged data block before said data block is changed so that the unchanged data blocks stored in said preservation memory means can be retrieved even though new data is written to said mass storage system after said second instant in time; and retrieving during said second time period the unchanged data blocks stored in said preservation memory means and transferring the retrieved data blocks to the backup storage location of the backup system.

2. A method of backing up data blocks as recited in claim 1 wherein said snapshot of the unchanged data is preserved without interruption of user access to said mass storage system.

3. A method of backing up data blocks as recited in claim 1 wherein said backup system is located at a remote site.

4. A method of backing up data blocks as recited in claim 1 wherein said backup system initiates the method of backing up data blocks.

5. A method of backing up data blocks as recited in claim 1 wherein said computer system initiates the method of backing up data blocks.

6. A method of backing up data blocks as recited in claim 1 further comprising the steps of:

the backup system storing the transferred data blocks in a temporary storage means until all data blocks to be transferred are received, and after all data blocks to be transferred are received, then the backup system applying the transferred data blocks to a backup storage means that includes all changes made prior to said first instant in time in order to bring the backup storage means current to said second instant of time.

7. A method of backing up data blocks as recited in claim 1 further comprising the steps of:

the backup system storing the transferred data blocks in a temporary storage means until all data blocks to be transferred are received; and after all data blocks to be transferred are received, then the backup system storing the transferred data blocks to a backup storage means.

8. A method of backing up data blocks as recited in claim 1, wherein the steps of identifying only those storage locations of said mass storage system that have changed and preserving a snapshot of the unchanged data are each conducted without regard to any file structure associated with said mass storage system.

9. In a computer system comprising a primary system having a mass storage system that stores data blocks in a plurality of storage locations each having a unique address, and a preservation memory means for providing a snapshot storage location, and wherein said computer system further comprises a backup system having a backup storage location, a method of backing up data blocks that are changed during a first time period that runs from first instant in time to second instant in time while reducing the amount of data that must be sent to the backup system, the method comprising the steps of:

identifying during a first time period that runs from a first instant in time to a second instant in time, only those storage locations of said mass storage system that have changed by virtue of new data stored in them during said first time period;

preserving a snapshot of the data stored, at said second instant of time, in the identified storage locations so that unchanged data from the identified storage locations is preserved when a write request that writes a new data block into at least one of the identified storage locations is received during a second time period that runs from said second instant of time to a third instant of time, by performing the steps of:

first checking to determine if the data block stored in said at least one of the identified storage locations at said second instant in time has been preserved in a preservation memory means;

if the data block stored in said at least one of the identified storage locations at said second instant in time has been preserved in said preservation memory means, then writing said new data block to said at least one of said identified storage locations; and if the data block stored in said at least one of the identified storage locations at said second instant in time has not been preserved in said preservation memory means, then first writing the data block stored in the at least one of the identified storage locations at said second instant in time into said preservation memory means, and then writing said new data block to said at least one of the identified storage locations; and transferring the data blocks stored at said second instant of time in the identified storage locations to a backup system.

10. A method of backing up data blocks as recited in claim 9 wherein said backup system is located at a remote site.

11. A method of backing up the mass storage system of computer systems to a backup system, said method comprising the steps of:

(1) establishing a connection between a backup system having attached backup storage means for storing data blocks and a computer system having attached mass storage means for storing a plurality of data blocks in a plurality of data storage locations, each having a unique address, so that data can be exchanged between said backup system and said computer system;

(2) said backup system receiving, and said computer system transferring, only those data blocks that have changed during a first time period that runs from a first instant in time and a second instant in time, said transferring and receiving of changed data blocks being performed by executing at least the steps of:

the computer system identifying storage locations of said mass storage system that have new data stored in them during said first time period;

during a second time period that runs from the second instant in time to a third instant in time, when a data block that was stored at said second instant in time in any of said identified storage locations is to be changed, the computer system preserving a snapshot of the unchanged data block before said data block is changed so that the unchanged data blocks preserved by said computer system can be retrieved even though new data is written to said mass storage system after said second instant in time, the computer system retrieving the data blocks stored, at said second instant in time, in said identified storage locations and transferring the retrieved data blocks to said backup system; and the backup system receiving the transferred data blocks; and (3) repeating steps (1) and (2) for each of said plurality of computer systems so that each of said plurality of computer systems has transferred, to said backup system, the data blocks that have changed during said first time period.

12. A computer-readable medium for use in a computer system comprising a mass storage means that stores a plurality of data blocks in a plurality of storage locations, each having a unique address, said computer-readable medium having computer-executable instructions comprising:

means for identifying which of said storage locations has had new data blocks stored therein during a time period that runs from a first instant in time and a second instant in time;

means for preserving a static snapshot at said second instant in time of the storage locations that have had new data blocks stored therein between said first instant in time and said second instant in time, said static snapshot including at least one unchanged data block that has been transferred, after said second instant in time, from one of said identified storage locations to said means for preserving a static snapshot before said one of said identified storage locations is changed by having a new data block written thereto, said static snapshot being preserved without terminating user access to said mass storage;

means for transferring the data blocks that were preserved by said static snapshot to a backup system.

13. A computer-readable medium as recited in claim 12 wherein said static snapshot is preserved at said second instant in time by copying a block of data stored in an identified storage location at said second instant in time to a preservation memory means whenever said data block is to be over-written by a new data block.

14. A computer-readable medium as recited in claim 12 wherein said computer-executable instructions further comprise means for determining when a logically consistent state has been achieved by said mass storage means so that said static snapshot preserves said logically consistent state.

15. A computer-readable medium as recited in claim 12 wherein said computer-executable instructions further comprise means for identifying differences between data blocks stored in said plurality of storage locations of said mass storage means and data blocks stored on a backup storage means on said backup system, said differences being identified after said time period.

16. A computer-readable medium as recited in claim 15 wherein said means for identifying differences identifies differences by calculating a digest for the data block stored in each storage location on said mass storage means and comparing said digest to a digest calculated on the data block stored in a corresponding storage location on said backup storage means.

17. A computer-readable medium as recited in claim 12 wherein said computer-executable instructions further comprise means for identifying storage locations of said mass storage means that have new data stored therein after said second instant in time.

18. A computer-readable medium for use in a computer system comprising a mass storage means that stores a plurality of data blocks in a plurality of storage locations, each having a unique address, said computer-readable medium having computer-executable instructions comprising:

means for identifying which of said storage locations has had new data blocks stored therein during a time period that runs from a first instant in time and a second instant in time;

means for preserving a static snapshot, at said second instant in time, of the storage locations that have had new data blocks stored therein between said first instant in time and said second instant in time, said static snapshot including at least one unchanged data block that has been transferred, after said second instant in time, from one of said identified storage locations to said means for preserving a static snapshot before said one of said identified storage locations is changed by having a new data block written thereto;

means for retrieving the data blocks that were preserved by said static snapshot; and means for transferring the retrieved data blocks to a backup system.

19. A computer-readable medium as recited in claim 18 wherein said computer-executable instructions further comprise means for determining when a logically consistent state has been achieved by said mass storage means so that said static snapshot preserves said logically consistent state.

20. A computer-readable medium as recited in claim 19 wherein said computer-executable instructions further comprise means for identifying differences between data blocks stored in said plurality of storage locations of said mass storage means and data blocks stored on a backup storage means on said backup system, said differences being identified after said time period.

21. A computer-readable medium as recited in claim 20 wherein said means for identifying differences identifies differences by calculating a digest for the data block stored in each storage location on said mass storage means and comparing said digest to a digest calculated on the data block stored in a corresponding storage location on said backup storage means.

* * * * *

UNITED STATES PATENT AND TRADEMARK OFFICE
CERTIFICATE OF CORRECTION

PATENT NO. : 5,835,953

DATED : Nov. 10, 1998

INVENTOR(S) : Richard Ohran

It is certified that error appears in the above-identified patent and that said Letters Patent is hereby corrected as shown below:

Cover Page, Title, left column, line 3, after "THAT" change "HAS" to --HAVE--

Cover Page, Other Publications, right column, line 3, after "in" change "Disater" to --Disaster--

Cover Page, Other Publications, right column, line 10, before "equipment" change "form" to --from--

Col. 4, line 54, after "site" change "becomes" to --become--

Col. 9, line 36, change "access, storage means be able to store the backup" to --access. All that is required is that--

Col. 10, line 12, after "device" change "12" to --24--

Col. 11, line 1, after "identifies" insert --a--

Col. 11, line 60, after "represent" insert --a--

Col. 12, line 38, after "primary" change "system" to --systems--

Col. 13, line 22, after "comprise a" change "boolean" to --Boolean--

Col. 15, line 5, after "order to" change "emphasis" to --emphasize--

Col. 19, line 12, after "FIG. 3." change "It" to --If--

Col. 19, line 50, after "such" insert --as--

UNITED STATES PATENT AND TRADEMARK OFFICE
CERTIFICATE OF CORRECTION

PATENT NO. : 5,835,953

DATED : Nov. 10, 1998

INVENTOR(S) : Richard Ohran

It is certified that error appears in the above-identified patent and that said Letters Patent is hereby corrected as shown below:

Col. 24, line 43, after "data" change "block" to --blocks--

Col. 26, line 52, before "are" change "then" to --they--

Col. 27, line 2, after "written" change "therein the" to --therein. The--

Col. 28, line 50, after "can be" change "presume d" to --presumed--

Col. 28, line 56, after "of the" change "compare" to --comparison--

Col. 31, line 62, after "from" insert --a--

Col. 31, line 63, after "to" insert --a--

Signed and Sealed this

Fourth Day of January, 2000

Attest:

Attesting Officer

*Acting Commissioner of Patents and Trademarks*